United States Patent
Morita et al.

(10) Patent No.: US 6,449,608 B1
(45) Date of Patent: Sep. 10, 2002

(54) VIDEO SEARCHING METHOD AND APPARATUS, VIDEO INFORMATION PRODUCING METHOD, AND STORAGE MEDIUM FOR STORING PROCESSING PROGRAM THEREOF

(75) Inventors: Koichi Morita, Yokohama; Mitsuo Asai, Higashimurayama; Tomoyuki Ishida, Yokohama; Takeshi Onodera, Kawasaki; Yoshihiro Takiyasu, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/991,920

(22) Filed: Nov. 26, 2001

Related U.S. Application Data

(63) Continuation of application No. 09/188,111, filed on Nov. 9, 1998.

(30) Foreign Application Priority Data

Nov. 10, 1997 (JP) .............................................. 9-307459

(51) Int. Cl.$^7$ .............................................. G06F 17/30
(52) U.S. Cl. ........................ 707/3; 707/104.1; 345/721; 386/83
(58) Field of Search .............................. 707/1, 3, 104.1; 348/564, 552; 382/232; 345/716, 719, 720, 721; 386/83

(56) References Cited

U.S. PATENT DOCUMENTS

| | | | |
|---|---|---|---|
| 5,537,528 A | 7/1996 | Takahashi et al. | 707/512 |
| 5,553,281 A | 9/1996 | Brown et al. | 707/104 |
| 5,831,616 A | 11/1998 | Lee | 345/348 |
| 5,835,667 A | 11/1998 | Wactlar et al. | 386/96 |
| 5,884,056 A | 3/1999 | Steele | 345/339 |
| 5,956,453 A | 9/1999 | Yaegashi et al. | 386/52 |
| 5,982,364 A | 11/1999 | Beckwith | 345/723 |
| 6,118,925 A | 9/2000 | Murata et al. | 386/83 |
| 6,157,744 A | 12/2000 | Nagasaka et al. | 382/236 |
| 6,204,840 B1 | 3/2001 | Petelycky et al. | 707/500.1 |

FOREIGN PATENT DOCUMENTS

| | | |
|---|---|---|
| EP | 0729117 | 8/1996 |
| EP | 0731469 | 9/1996 |
| EP | 0737978 | 10/1996 |
| EP | 0774756 | 5/1997 |
| EP | 0859365 | 8/1998 |
| EP | 0871177 | 10/1998 |
| EP | 0915469 | 5/1999 |
| JP | 5-81348 | 4/1993 |
| JP | 8-227462 | 9/1996 |
| WO | 98/34181 | 8/1998 |
| WO | 98/34182 | 8/1998 |

OTHER PUBLICATIONS

K. Tanaka et al., "'KANTAN' Video Image Retrieval User Interface', *Hitachi Review*, vol. 45, No. 2, Apr. 1996, pp. 95–100, published by Hitachi, Ltd., Tokyo, Japan.

A. Hanjalic et al., "Automation of systems enabling search on stored video data", *Proceedings of SPIE*, vol. 3022, Jan. 1997, pp. 427–438.

N. Dimitrova et al., "Video Keyframe Extraction and Filtering: A Keyframe is not a Keyframe to Everyone", *Proceedings of the Sixth International Conference on Information and Knowledge Management*, Las Vegas, Nevada, USA, Nov. 10–14, 1997, pp. 113–120, published by ACM.

*Primary Examiner*—Jack Choules
(74) *Attorney, Agent, or Firm*—Antonelli, Terry, Stout & Kraus, LLP

(57) ABSTRACT

A video searching method, and apparatus, having a function of representing a video file are provided such that the contents of video files stored in a storage device may be recognized definitely and rapidly. The video searching apparatus includes a computer, a storage device, a device for controlling them, and a display device. The apparatus includes a software resource for producing a group image formed of at least two still images of scenes representing the contents of each of video files stored in the storage device. In the apparatus, the size of the group image is changed at any time. In response to manipulation of the group image, file operation such as deletion, movement or name change of a corresponding video file is performed.

9 Claims, 23 Drawing Sheets

FIG.2

| VIDEO FILE NAME | FILE FORMAT | PRODUCTION DATE AND HOUR | THE TOTAL NUMBER OF FRAMES | BYTE SIZE (MB) | BIT RATE (MB/s) | REPRODUC-TION TIME (s) | PICTURE SIZE | KEYWORD |
|---|---|---|---|---|---|---|---|---|
| VIDEO FILE 1 | MPEG | 96/12/12 18:21 | 2430 | 486 | 6.0 | 81 | 720×486 | MOON |
| VIDEO FILE 2 | MPEG | 94/07/18 10:49 | 12150 | 2025 | 5.0 | 405 | 720×486 | IRON |
| VIDEO FILE 3 | AVI | 95/03/04 15:03 | 903 | 120 | 4.0 | 30 | 720×486 | SUN |
| VIDEO FILE 4 | AVI | 93/10/30 08:59 | 63 | 14 | 7.0 | 2 | 720×486 | BALL |
| ...... | ...... | ...... | ...... | ...... | ...... | ...... | ...... | ...... |
| 400 | 401 | 402 | 403 | 404 | 405 | 406 | 407 | 408 |

| TIME/FRAME SELECTION FLAG | TIME INTERVAL VALUE (s) | FRAME INTERVAL VALUE |
|---|---|---|
| T (OR F) | 5 | 75 |

| NUMBER OF LONGITUDINAL SHEETS | NUMBER OF LATERAL SHEETS |
|---|---|
| 3 | 3 |

600     601

VIDEO SEARCHING METHOD AND APPARATUS, VIDEO INFORMATION PRODUCING METHOD, AND STORAGE MEDIUM FOR STORING PROCESSING PROGRAM THEREOF

CROSS-REFERENCE TO RELATED APPLICATION

This application is a continuation of application Ser. No. 09/188,111 filed on Nov. 9, 1998, the contents of which are incorporated herein by reference in their entirety.

BACKGROUND OF THE INVENTION

The present invention relates to a video searching method, and apparatus, capable of representing contents of a video file stored in a storage device as a group of images so as to make the contents of the video file definitely recognizable without reproducing the video file.

As the speed of computers becomes higher and the capacity of storage devices such as hard disks becomes larger in recent years, it has become possible to handle moving images and voices by digitizing them. There have come to be staged various multimedia systems such as a VDR (video disk recorder) capable of compressing moving images and voices, and storing and reproducing the compressed moving images and voices, and a nonlinear editing machine capable of editing moving images and voices taken into a storage device such as a hard disk in program production of television broadcast and video production. In these multimedia systems, various kinds of attribute information such as file format, file name, production date and hour, reproduction time, the total number of frames, data rate, compression factor, keyword, and a still image of a top scene, i.e., top picture frame of a video file are used in order to search a large number of video files stored in a storage device such as a hard disk. Especially as examples of a video searching technique for facilitating the confirmation of contents of video material of an enormous amount stored in a storage device, techniques disclosed in JP-A-5-81348 (applied for a patent by Dainihon Printing) and JP-A-8-227462, for example, can be mentioned. In the former-cited publication, a frame extracting and searching apparatus for arranging time-axis images obtained from moving images recorded on a tape medium, on a time axis and displaying them as still images extracted at fixed intervals is disclosed. However, there is no concept of image extraction from a video file. According to the latter-cited technique, it is possible to divide moving images into scenes on the basis of the characteristic values of images and voices, and produce a list of top picture frames of respective scenes. By referring to the display of this list, the user can definitely recognize contents of respective video files, know what material exists, and select a desired scene easily. Here, a scene means a moving image section having no intermission taken by one camera. In the case where moving images are stored in a storage device as video files respectively corresponding to scenes, an abrupt change does not occur between frames, each of which is a still image forming moving images, in a scene. By referring to a still image information of a top scene of that video file, therefore, its contents can be sufficiently grasped. The still image information of the top scene of the video file becomes a very important visual information in searching for a video file.

SUMMARY OF THE INVENTION

Such a conventional apparatus has the following problem. In the case where each scene is stored in a storage device as a video file, its contents can be judged on the basis of only the still image information of the top scene of that video file. In general, however, moving images or video images are not necessarily stored in a storage device as video files by taking a scene as the unit. In such a case, each video file is formed of a plurality of scenes. In selecting a desired video file out of a large number of video files stored in a storage device, it is very difficult to judge the content of a video file by referring to only the still image information of the top scene of the video file. For certainly searching for and selecting a desired video file, it becomes necessary to advance the search work while reproducing that video file thoroughly and confirming it. Therefore, it takes much time to search enormous video files stored in a storage device such as a hard disk.

Furthermore, in general, video images in use are produced by editing enormous video materials. If at the time of video editing work it is possible to search for video materials without going away from the video editing work, editing the video materials searched for, and storing the result of the editing into a storage device, then it is natural that the video editing work can be advanced more efficiently.

Therefore, an object of the present invention is to provide a video searching method, and apparatus, having a function necessary for and useful for a work for searching for a video file, and a function of displaying a group of images, whereby the user can rapidly recognize the content of a video file such as a general view, for each of video files stored in a storage device.

Another object of the present invention is to provide a video searching method, and apparatus, having a function of storing moving images or video images in a storage device, and conducting a display so as to make the user capable of recognizing the content of a stored video file rapidly and definitely, i.e., judging the general view rapidly under control from a video editing system.

In accordance with one aspect of the present invention, a video searching method for searching and displaying moving images or video images desired by the user comprises the steps of extracting as many images as specified beforehand by the user from each of video files already stored, arranging the images in an arrangement specified beforehand by the user to form a group image, displaying the group image in a predetermined position, and displaying the moving images or video images corresponding to the displayed group image selected by the user. As a result, the contents of that video file can be recognized rapidly and definitely. Therefore, the efficiency of the work of searching enormous video files is increased.

In accordance with another aspect of the present invention, a video searching method, and apparatus, having the above described search and display function has means for managing the moving images or video images and is provided with a function of controlling a storage device which stores the moving images or video images. Furthermore, the video searching method, and apparatus, is provided with a function of editing the stored moving images or video images. As a result, the contents of the stored moving images or video images can be recognized definitely. At the time of video editing work, therefore, desired moving images or video images can be searched for certainly. In addition, the moving images or video images thus searched for can be edited efficiently, and a result of the editing can be stored in the storage device efficiently.

Other objects, features and advantages of the present invention will become apparent from reading the detailed description of embodiments of the invention taken in conjunction with the accompanying drawings.

BRIEF DESCRIPTION OF THE DRAWING

FIG. 2 is a diagram showing the configuration of a video information storing table 302 stored in the external storage device 103;

FIG. 3 is a diagram showing the configuration of a digest setting table 303 stored in the external storage device 103;

FIG. 4 is a diagram showing the configuration of a multi-icon (multi-still images) setting table 304 stored in the external storage device 103;

FIG. 17 is a diagram showing a screen on the display device 100 obtained when a video file is displayed in a digest from;

DESCRIPTION OF THE PREFERRED EMBODIMENTS

Embodiments of the present invention will be described by referring to accompanying drawing.

Figure 1:
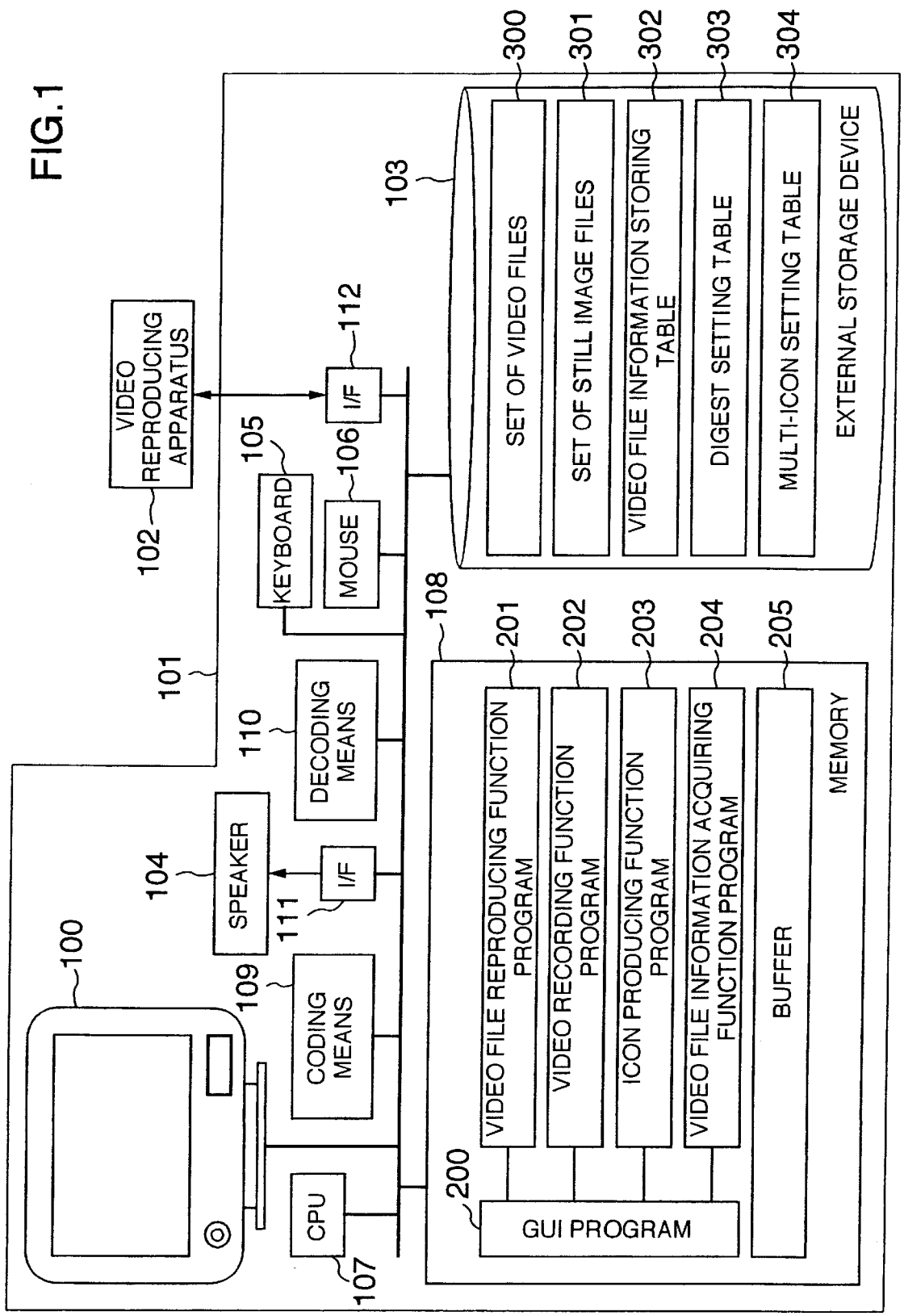
FIG. 1 is a diagram showing a system configuration of a video searching method, and apparatus, in one embodiment of the present invention, a processing program configuration for executing functions concerning the present invention, and information stored in an external storage device 103.

FIG. 1 exemplifies a system configuration of a video searching method, and apparatus, according to a representative embodiment of the present invention, an example of a processing program configuration for executing functions concerning the present invention, and information stored in an external storage device 103. First of all, the above described system configuration of the video searching method, and apparatus, will now be described. As shown in FIG. 1, the video searching method, and apparatus, are equipped with a display device 100 and a video searching apparatus 101 connected to the display device 100 to send predetermined signals thereto. This video searching apparatus 101 includes a CPU 107 for system control, a memory 108 for storing a program and the like for executing processing in the CPU 107, a coding means 109 for digitizing moving images, or moving images and voices and converting them into a format which can be processed by the video searching apparatus 101, a decoding means 110 for conducting conversion which is inverse of the conversion of the coding means 109, a voice output interface (I/F) 111, and a video input/output interface (I/F) 112 functioning to send/receive data to/from an external video apparatus 102. In addition, a keyboard 105 and a mouse 106 are connected to the video searching apparatus 101.

Furthermore, to the video searching apparatus 101, there are connected a video reproducing apparatus 102 for reproducing video images formed of moving images, or formed of moving images and voices recorded on video tape or the like via the video input/output interface 112, an external storage device 103 for storing as a video file, a result of conversion of video images input from the video reproducing apparatus 102 to a format which can be processed by the video searching apparatus 101, conducted by the coding means 109 included in the video searching apparatus 101, and a speaker 104 for outputting voices input from the video reproducing apparatus 102 as they are, or outputting original voices restored from a video file stored in the external storage device 103 by the decoding means 110 included in the video searching device 101.

Figure 12:
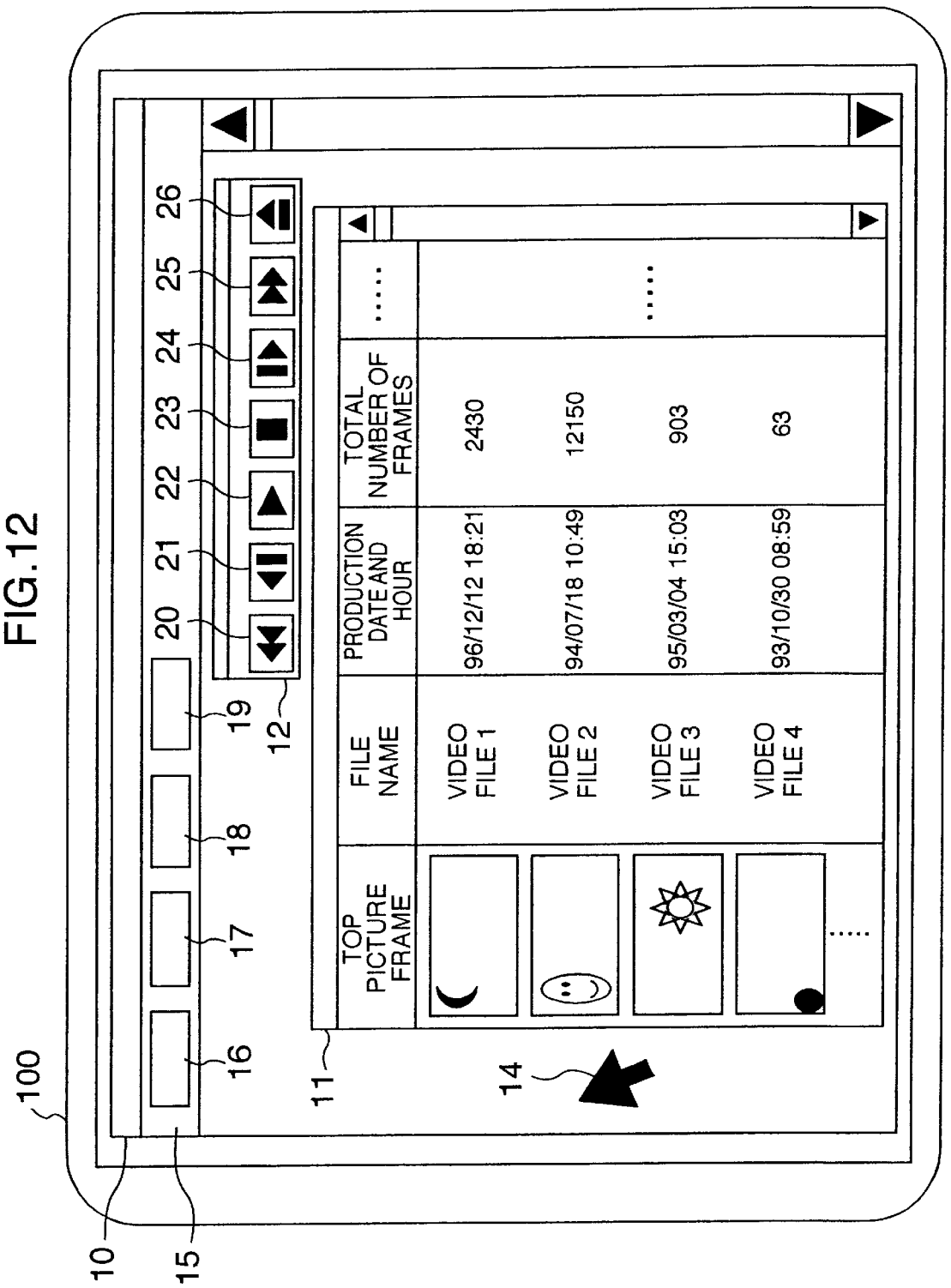
FIG. 12 is a diagram showing a screen (initial screen) on a display device 100 obtained in an embodiment of the present invention immediately after execution of a GUI program 200, which is a processing program equipped with an interactive environment between the user and the system shown in FIG. 1 to comprehensively control a video file reproducing function program 201, a video recording function program 202, an icon producing function program 203, and a video file information acquiring function program 204.

Hereafter, an image obtained by displaying a still image file of top scenes of video files in a browsing window 11 as shown in FIG. 12 is referred to as single icon. A group image obtained by displaying, in the browsing window 11, a still image file produced from still images of at least two scenes extracted from video files is referred to as multi-icon. Still images of scenes are extracted from video files at predetermined time intervals or frame intervals as still image files. Those still image files are displayed on a digest window (as shown in FIGS. 17 to 21) as images in the order of time axis together with a time code of that scene. This is referred to as digest.

FIG. 1 further shows a processing program configuration for executing functions concerning the present invention, and information stored in the external storage device 103. These processing programs are stored in the external storage device 103, and they are transferred to the memory 108 according to a command of the CPU 107 caused by a user's start request. A GUI (graphic user interface) program 200 is a processing program providing an interactive environment between the user and the system shown in FIG. 1 to comprehensively control four programs described later, i.e., a video file reproducing (playback) function program 201, a video recording function program 202, an icon producing function program 203, and a video file information acquiring function program 204. This GUI program 200 has a buffer 205 for temporarily storing a processing result and the like in each processing. In the external storage device 103, there exist a set 300 of video files already stored by the video recording function program 202, a set 301 of still image files for storing still image files of still images of top scenes for respective video files in the video file set 300 and still image files used for the multi-icon, a video file information storing table 302 for storing video file attribute information such as a file name, a file format, production date and hour, and the total number of frames for each of the files in the video file set 300, a digest setting table 303 for storing matters set for the digest display, and a multi-icon setting table 304 for storing matters set for producing still image file used to display the multi-icon. The video file reproducing function program 201 is a processing program called when the user requests the GUI program 200 to reproduce video files stored in the video file set 300 of the external storage device 103. The video recording function program 202 is a processing program called when the user requests the GUI program 200 to store video images such as moving images, or moving images and voices in the external storage device 103. The icon producing function program 203 is a processing program for extracting a still image of a scene from a video file stored in the video file set 300 of the external storage device 103 and producing a still image file to be used to display a desired image or image group. The produced image file is stored in the still image file set 301 of the external storage device 103, and displayed to the user by the GUI program 200. The video file information acquiring function program 204 is a processing program for acquiring video file attribute information such as a video file name, a file format, production date and hour, and the total number of frames from a video file stored in the video file set 300. The acquired video file attribute information is stored in the video file information storing table 302, and displayed to the user by the GUI program 200. In the video searching apparatus 101, the functions concerning the present invention are executed by the processing of the CPU 107 according to a program such as the GUI program 200.

FIG. 2 shows components forming the video file information storing table 302. This video file information storing table 302 is a table required not only when displaying a video file in the multi-icon form but also when displaying a certain video file in the digest form. The video file information storing table 302 includes a video file name 400, a file format 401, a production date and hour 402, the total number of frames 403, a byte size 404, a bit rate 405, a reproduction time 406, a picture size 407 of a video file when it is stored, and a keyword 408. The video file name 400 represents a name that a video file stored in the external storage device 103 is provided with by the user. The file format 401 represents a format to which the video file has been converted so that the video searching apparatus 101 may process it when it is stored in the external storage device 103 by the coding means 109. The production date and hour 402 represents the date and hour when the video file has been stored in the external storage device 103. The total number of frames 403 represents the total number of frames of moving images or video images stored in the external storage device 103. The byte size 404 represents the data amount of the video file when it has been stored in the external storage device 103 by the coding means 109. The bit rate 405 represents the amount of data coded and stored in the external storage device 103 by the coding means 109 per second. The reproduction time 406 represents the time required to reproduce the video file stored in the external storage device 103 until the end is reached. The picture size 407 represents the resolution used when the video file is reproduced. The keyword 408 represents a remarks column given to the video file stored in the external storage device by the user. Each of rows of the video file information storing table 302 is stored in the external storage device 103 as an attribute information file corresponding to each video file. The video file information storing table 302 is formed of those attribute information files.

FIG. 3 shows elements forming the digest setting table 303. This digest setting table 303 is a table required, when displaying a certain video file in the digest form, to cause a change to setting desired by the user at any time. The digest setting table 303 is formed of a time/frame selection flag 500, time interval value 501, and frame interval value 502. The time/frame selection flag 500 represents a flag for selecting whether a digest should be produced at time intervals or a digest described later should be produced at frame intervals. The time interval value 501 represents an interval setting value used when producing a digest at time intervals. The frame interval value 502 represents an image pickup interval setting value used when producing a digest at frame intervals. With reference to FIG. 3, the time/frame selection flag 500 is set to T when producing a digest at time intervals, and set to F when producing a digest at frame intervals. By the way, T represents the first letter of "TRUE," and F represents the first letter of "FALSE." The example of FIG. 3 is set so as to produce a digest at equal intervals of 5 seconds.

FIG. 4 shows elements forming the multi-icon setting table 304. This multi-icon setting table 304 is a table required, when displaying a video file in the multi-icon form, to cause a change to setting desired by the user at any time. The multi-icon setting table 304 is formed of the number 600 of longitudinal sheets and the number 601 of lateral sheets. The number 600 of longitudinal sheets represents the number of longitudinal still images in producing a still image file used to conduct a multi-icon display by arranging still images in a matrix form. The number 601 of lateral sheets represents the number of lateral still images in producing a still image file used to conduct a multi-icon display by arranging still images in a matrix form. The example of FIG. 4 is set so as to produce a multi-icon display with three longitudinal sheets and three lateral sheets, i.e., a total of nine sheets.

Hereafter, it is assumed that various video images are already supplied from the video reproducing apparatus 102, converted to such a format that the video searching apparatus 101 can process by the coding means 109, and stored in the external storage device 103 as video files.

Figure 5:
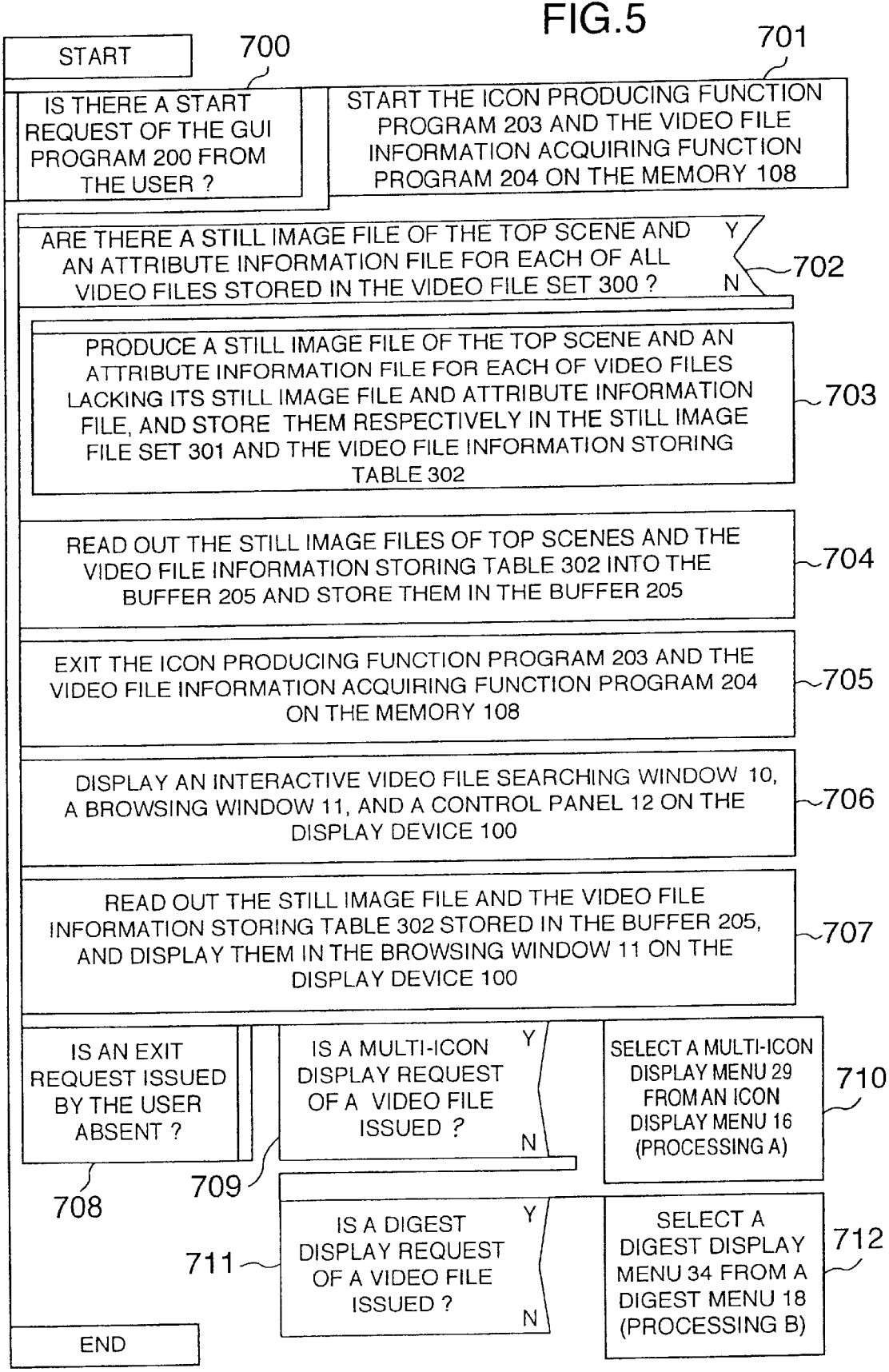
FIG. 5 is a diagram showing the general stream of processing concerning a video searching method, and apparatus, in an embodiment of the present invention.

FIG. 5 shows the flow of the entire processing concerning the video searching method, and apparatus, of the present invention. If there is a start request of the GUI program 200 from the user at step 700, the CPU 107 reads the GUI program 200 from the external storage device 103, stores it in the memory 108, and starts it. Upon being started, the GUI program 200 reads out the icon producing function program 203 and the video file information acquiring function program 204 onto the memory 108, and starts them at step 701. For each of all video files stored in the video file set 300, it is determined at step 702 whether there are a still image file of the top scene extracted from each of the video files, and an attribute information file (FIG. 2) storing the video file name, file format, production date and hour, and the like. If all of them exist, their still image files and the video file information storing table 302 are read out and stored in the buffer 205 as shown in step 704. If even one of them does not exist, then at step 703 the GUI program 200 produces a still image file of the top scene and an attribute information file for each of video files lacking its still image file and attribute information file, stores them respectively in the still image file set 301 and the video file information storing table 302, thereafter reads out and stores those still image files and the video file information storing table 302 in the buffer 205. At step 705, the icon producing function program 203 and the video file information acquiring function program 204 on the memory 108 are finished. Thereafter, at step 706, the GUI program 200 displays an interactive video file search window 10, a browsing window 11, and a control panel 12 as shown in FIG. 12 on the display device 100. At step 707, the GUI program 200 displays the still image file and the video file information storing table 302 stored in the buffer 205 in the browsing window 11. The processing described heretofore is initializing processing conducted by starting the GUI program 200. At step 708, it is determined whether there is an exit request issued by the user. If there is not an exit request, processing of steps 709 to 712 is conducted. If there is an exit request, this GUI program 200 is closed. When the user wants to exit the GUI program 200, the user may click an exit menu 19 of a menu 15 (FIG. 12). At step 709, it is determined whether there is a multi-icon display request of a video file issued by the user. If there is a multi-icon display request, processing responsive to selecting a multi-icon display menu 29 from an icon display menu 16 is conducted at step 710. This is referred to as processing A. If there is not a multi-icon display request, it is determined at step 711 whether there is a digest display request of a video file issued by the user. If there is a digest display request, processing responsive to selecting a digest display menu 34 from a digest menu 18 is conducted at step 712. This is referred to as processing B. If there is not a digest display request, then it is determined at the step 708 whether there is an exit request, and then it is determined whether there is a multi-icon display request. Details of the processing A of the step 710 and the processing B of the step 712 will be described below.

Hereafter, details of the processing A and the processing B of FIG. 6 will be described.

Figure 6:
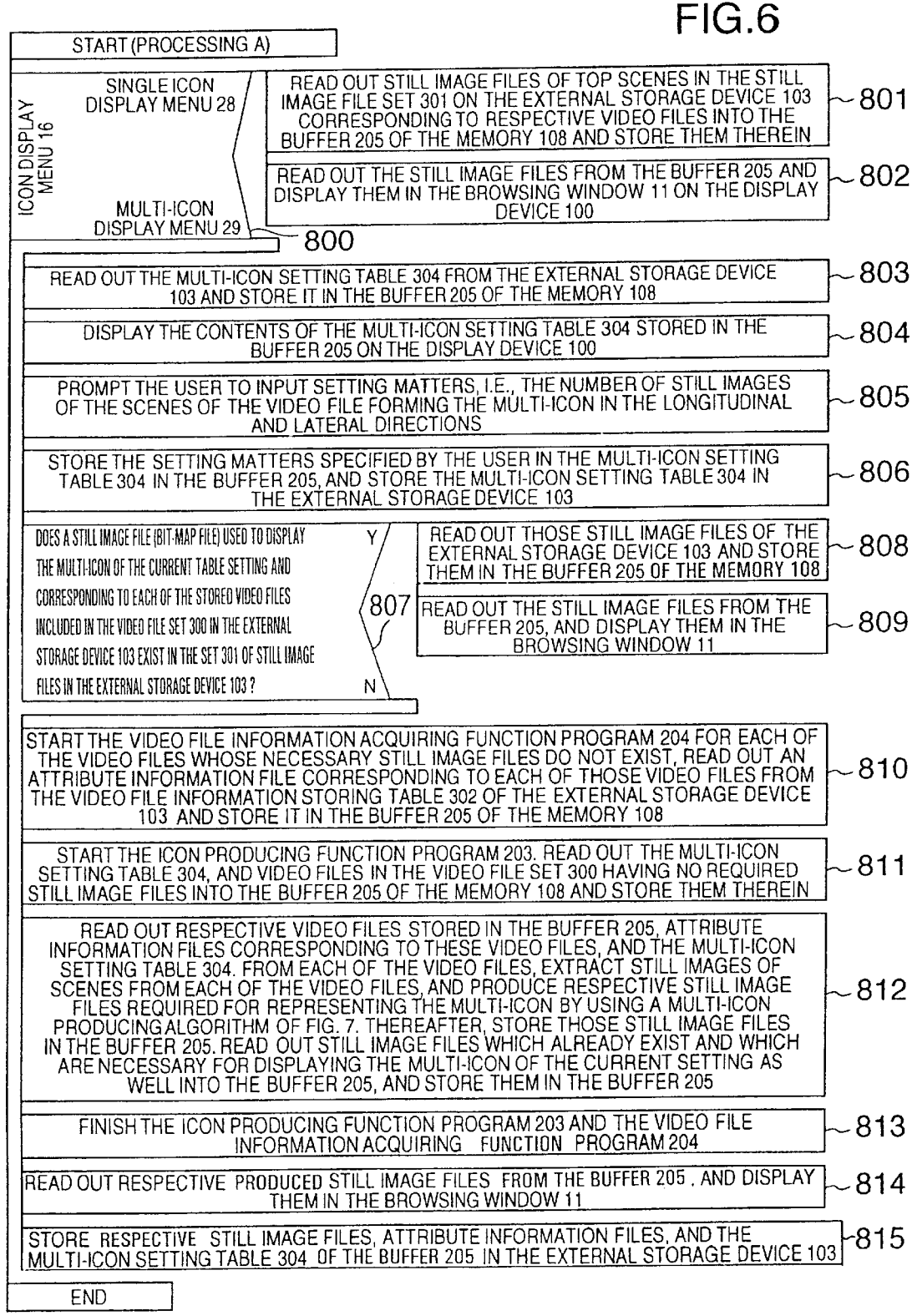
FIG. 6 is a diagram showing processing A conducted when a multi-icon display request is issued.

FIG. 6 shows the processing A conducted at the step 710 of FIG. 5 when there is a multi-icon display request issued by the user. In the processing of FIG. 6, manipulation for displaying a single icon in the browsing window 11 and manipulation for displaying a multi-icon are shown (see FIG. 12). This processing A is started by selecting the icon display menu 16 out of the menu 15 in the interactive video file searching window 10. At step 800, either the single icon display menu 28 or the multi-icon display menu 29 included in the icon display menu 16 is selected. If the single icon display menu 28 is selected, still image files of top scenes corresponding to respective video files are read out and stored in the buffer 205 at step 801. At step 802, they are displayed in predetermined positions of the browsing window 11 as single icons. If the multi-icon display menu 29 is selected, then the multi-icon setting table 304 is read out from the external storage device 103 and stored in the buffer 205 at step 803, and its content is displayed on the display device 100 at step 804. At step 805, the user is prompted to input setting matters, i.e., the number of still images of the scenes of the video file in the longitudinal and lateral directions. Therefore, the user conducts the setting as the user desires. At step 806, the input setting matters are stored in the multi-icon setting table 304 in the buffer 205, and then the multi-icon setting table 304 is stored in the external storage device 103. Then it is determined at step 807 whether a still image file (bit-map file) used to display the multi-icon of the current table setting and corresponding to each of the stored video files included in the video file set 300 in the external storage device 103 exists in the set 301 of still image files. If it exists, then at step 808 those still image files of the external storage device 103 are read and stored in the buffer 205, and are displayed in predetermined positions of the browsing window 11 as a multi-icon at step 809. If there is even one still image file used to display the multi-icon of the current table setting which does not exist in the set 301 of still image files, then at step 810 the video file information acquiring function program 204 is started. For each of the video files whose necessary still image files do not exist, an attribute information file corresponding to each of those video files is read from the video file information storing table 302 and stored in the buffer 205. At step 811, the icon producing function program 203 is started, and the multi-icon setting table 304 and video files in the video file set 300 having no required still image files are read out and stored in the buffer 205. Thereafter, at step 812, respective video files stored in the buffer 205, attribute information files corresponding to those video files, and the multi-icon setting table 304 are read out. From each of the video files, still images of scenes are extracted by a multi-icon producing algorithm of FIG. 7 described later. Respective still image files required for representing the multi-icon are produced. Those still image files are stored in the buffer 205. In addition, still image files which already exist in the still image file set 301 and which are necessary for displaying the multi-icon of the current table setting are also read out and stored in the buffer 205. At step 813, the icon producing function program 203 and the video file information acquiring function program 204 are finished. At step 814, respective still image files for multi-icon display are read out and displayed in predetermined positions of the browsing window 11 as a multi-icon. Finally, at step 815, the still image files, attribute information files, and the multi-icon setting table 304 in the buffer 205 are stored in the external storage device 103. As a result, the processing A is completed, and a single icon or multi-icon can be displayed in the browsing window 11. In both the single icon display and the multi-icon display, selection of an expansion icon menu 30 (FIG. 12) in an icon size menu 17 causes the icon producing function program 203 to be started, the still image files used for that icon display to be read into the buffer 205, changed into still image files for expanded display, and displayed in the browsing window 11 again, and thereafter the icon producing function program 203 to be finished. In the same way, selection of a standard icon menu 31 (FIG. 12) in the icon size menu 17 causes the icon producing function program 203 to be started, the still image file used for its icon display to be read into the buffer 205, changed into still image files for standard display, and displayed in the browsing window 11 again, and thereafter the icon producing function program 203 to be finished. Selection of a contraction icon menu 32 (FIG. 12) in the icon size menu 17 causes the icon producing function program 203 to be started, the still image file used for its icon display to be read into the buffer 205, changed into still image files for contracted display, and displayed in the browsing window 11 again, and thereafter the icon producing function program 203 to be finished. These manipulations make possible three stages of display, i.e., expansion, standard, and contraction, together with the single icon and multi-icon. In an initial setting, the standard display is set. Furthermore, by selecting the single icon or the multi-icon in the browsing window 11 and conducting the drag and drop manipulation with the mouse 106 of FIG. 1, file manipulation such as deletion, movement or name change of a video file corresponding to the single icon or the multi-icon can be accomplished. Furthermore, by conducting double-click manipulation with the mouse 106 of FIG. 1, it is also possible to reproduce a video file corresponding to the selected single icon or multi-icon.

Figure 7:
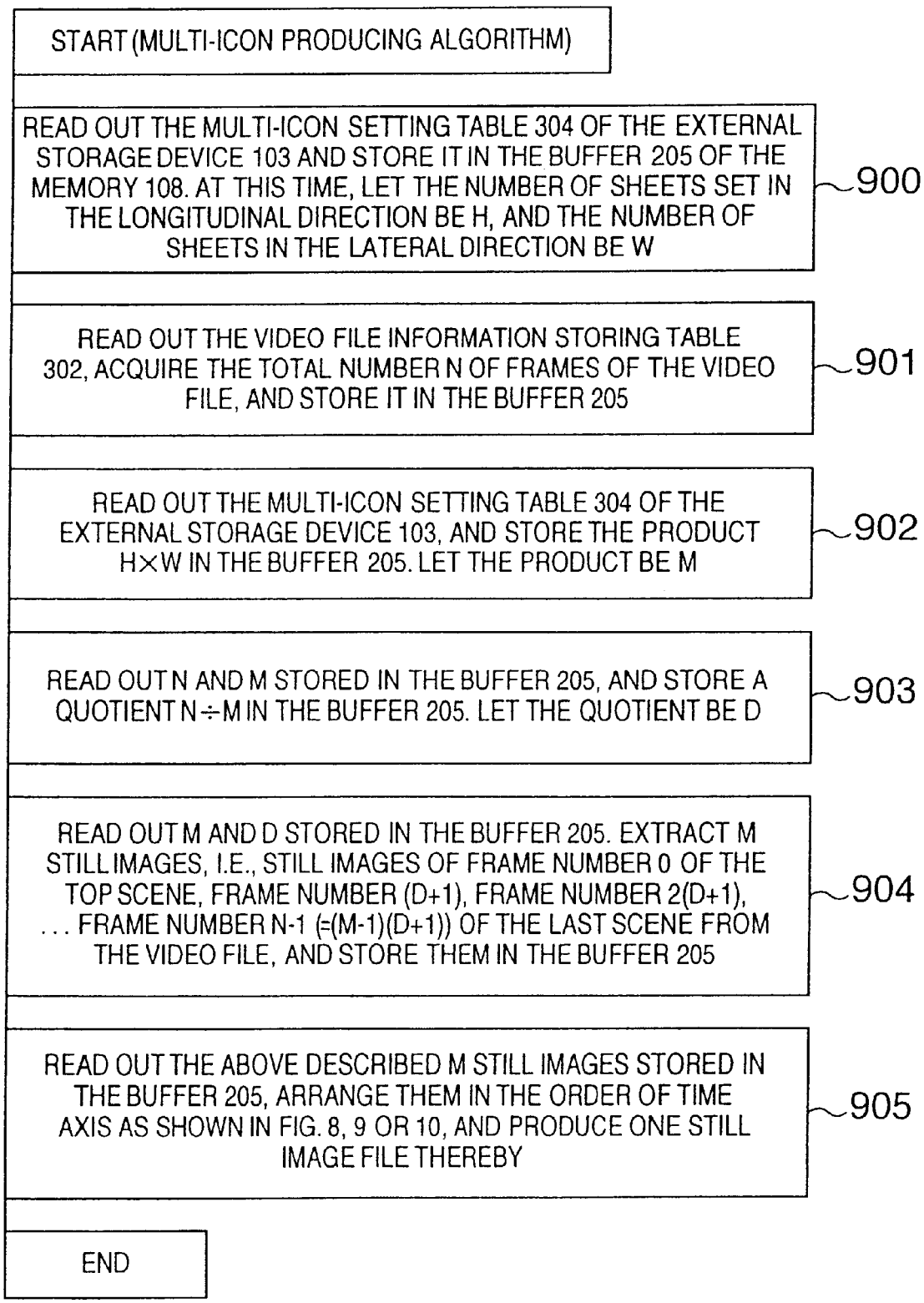
FIG. 7 is a diagram showing an algorithm used when producing a still image file (bit-map file) to be used for multi-icon display.

FIG. 7 shows the flow of the multi-icon producing algorithm used in FIG. 6. In order to display the current setting on the display device 100, the algorithm begins with reading out the multi-icon setting table 304 of the external storage device 103 and storing it in the buffer 205 of the memory 108 at step 900. At this time, the number of sheets of the selected scene still image for one video file is set to H in the longitudinal direction and set to W in the lateral direction. At step 901, attribute information files corresponding to the video files which are contained in the video file information storing table 302 and which do not have still image files required to display the multi-icon of the current setting are read out into the buffer 205. The total number of frames is acquired and stored. It is assumed that the total number of frames acquired at that time is N. At step 902, from the values of H and W of the multi-icon setting table 304 stored in the buffer 205, a product H×W is calculated, and the product is stored in the buffer 205. The product is denoted by M. At step 903, a quotient N/M is calculated from the values of N and M stored in the buffer 205, and stored in the buffer 205. The quotient is denoted by D. At step 904, the video file is read out and stored in the buffer 205. From that video file, M scene still images, i.e., still images of frame number 0, frame number (D+1), frame number 2(D+1), . . . frame number (M−1)(D+1) (=N−1) are extracted and stored in the buffer 205. At step 905, those M still images are read out, arranged in the order of time axis, and produced as one still image file. As for the arrangement in the order of time axis, there are three kinds and the user can select at any time.

Figure 8:
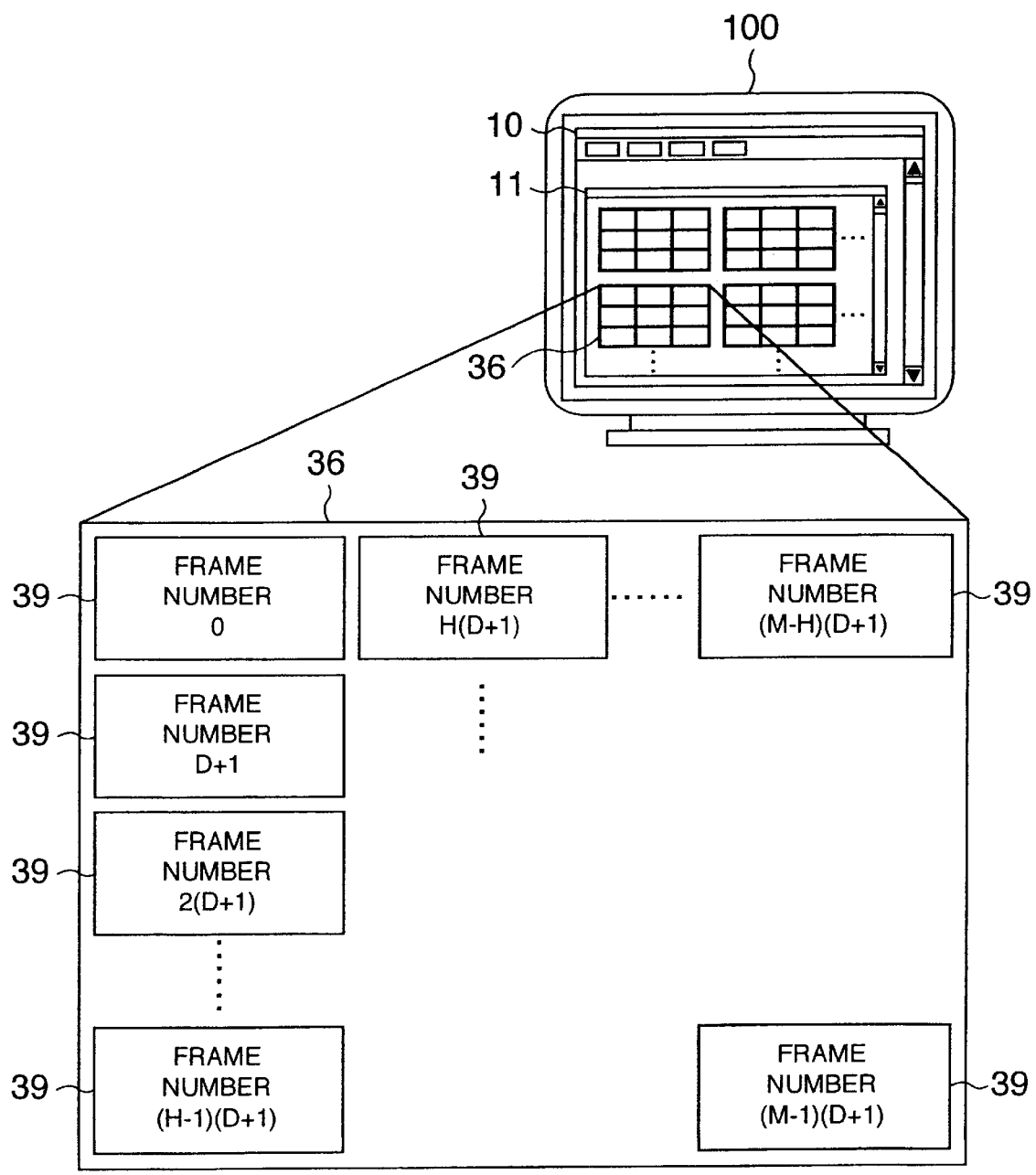
FIG. 8 is a diagram showing a method for arranging still images extracted from a video file when producing a still image file to be used for multi-icon display.

FIG. 8 shows how the multi-icon producing algorithm of FIG. 7 arranges M extracted still images in the order of time axis to form one still image file and displays a multi-icon by using the still image file. FIG. 8 is formed of the display device 100, the interactive video file searching window 10, the browsing window 11, a matrix-shaped multi-icon 36, and still images 39 of the respective frame numbers of the video file. As shown in FIG. 8, the still images are arranged in a matrix form in the order of time axis beginning with the leftmost top, and thus one still image file is formed. By using that still image file, the arranged still images are displayed in a predetermined position of the browsing window 11 as a matrix-shaped multi-icon 36. One of the matrix-shaped multi-icons 36 is enlarged and illustrated. M still images 39 having respective frame numbers are arranged as shown in FIG. 8 to form one still image file. By representing the still image file as a multi-icon, the matrix-shaped multi-icon 36 is obtained.

Figure 9:
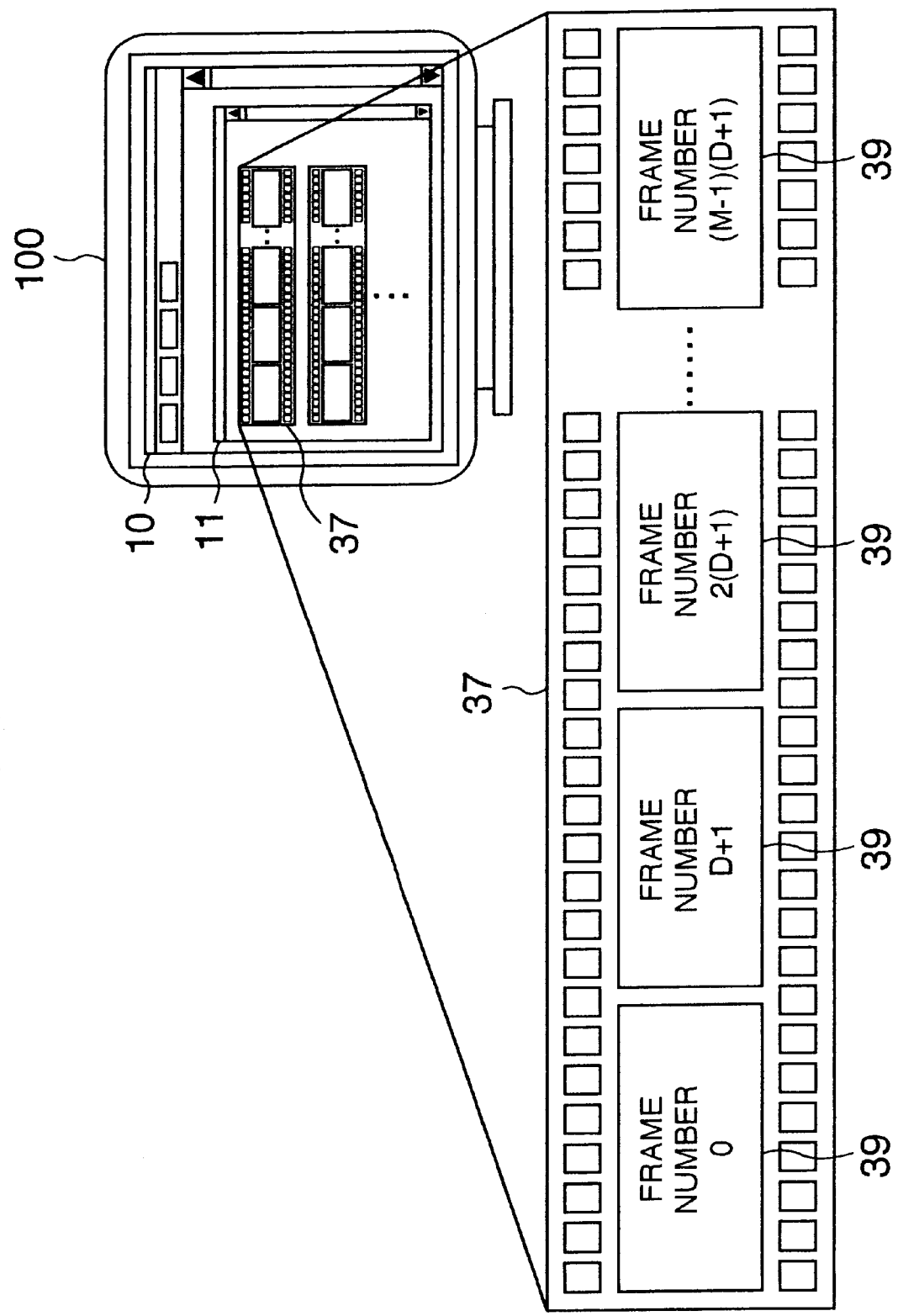
FIG. 9 is a diagram showing a method, different from that of FIG. 8, for arranging still images extracted from a video file when producing a still image file to be used for multi-icon display.

FIG. 9 shows how the multi-icon producing algorithm of FIG. 7 arranges M extracted still images in the order of time axis to form one still image file and displays a multi-icon by using the still image file. FIG. 9 is formed of the display device 100, the interactive video file searching window 10, the browsing window 11, a multi-icon 37 having still images arranged sideways, and still images 39 of the respective frame numbers of the video file. As shown in FIG. 9, the still images are arranged sideways in the order of time axis from the left, and thus one still image file is formed. By using that still image file, the arranged still images are displayed in a predetermined position of the browsing window 11 as a multi-icon 37 having still images arranged sideways. One of the multi-icons 37 having still images arranged sideways is enlarged and illustrated. M still images 39 having respective frame numbers are arranged as shown in FIG. 9 to form one still image file. By representing the still image file as a multi-icon, the multi-icon 37 having still images arranged sideways is obtained.

Figure 10:
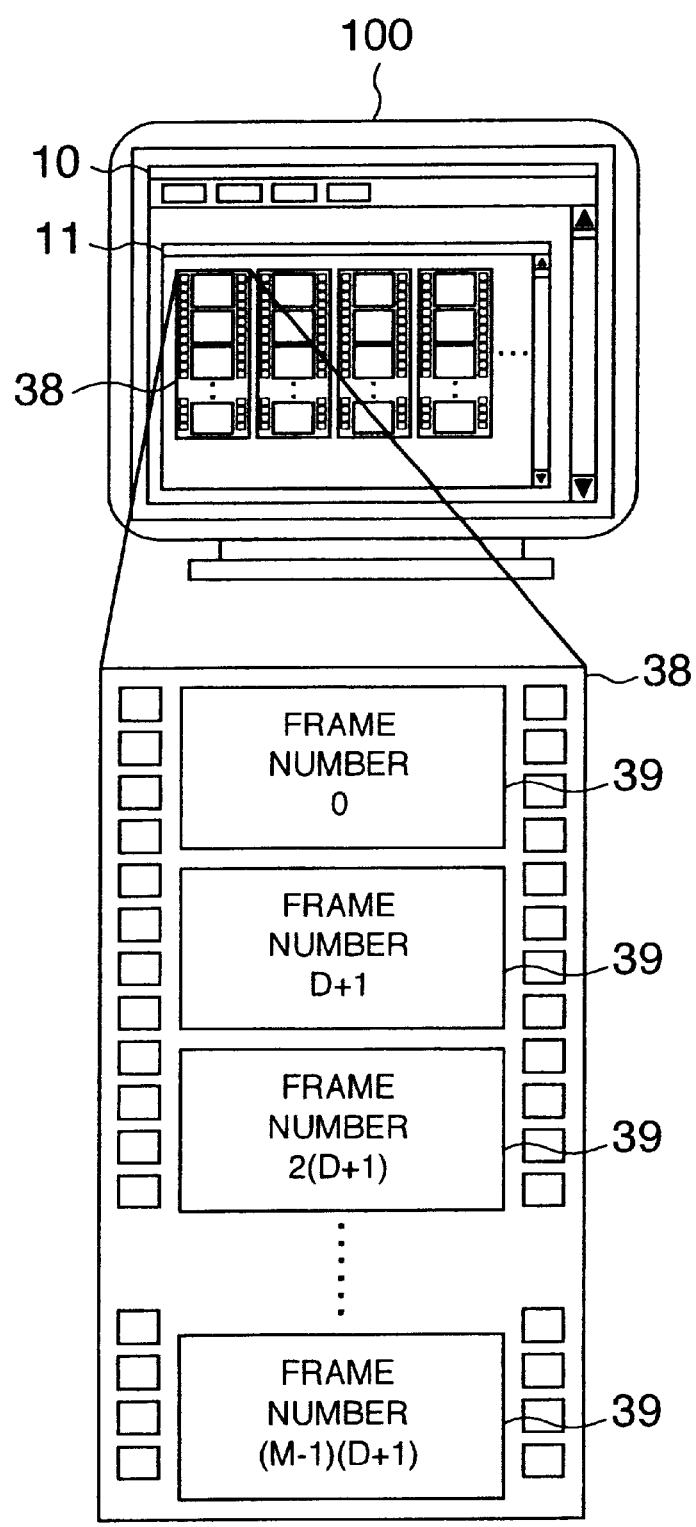
FIG. 10 is a diagram showing a method, different from that of FIG. 8 and that of FIG. 9, for arranging still images extracted from a video file when producing a still image file to be used for multi-icon display.

FIG. 10 shows how the multi-icon producing algorithm of FIG. 7 arranges M extracted still images in the order of time axis to form one still image file and displays a multi-icon by using the still image file. FIG. 10 is formed of the display device 100, the interactive video file searching window 10, the browsing window 11, a multi-icon 38 having still images arranged lengthwise, and still images 39 of the respective frame numbers of the video file. As shown in FIG. 10, the still images are arranged lengthwise in the order of time axis from the top, and thus one still image file is formed. By using that still image file, the arranged still images are displayed in a predetermined position of the browsing window 11 as a multi-icon 38 having still images arranged lengthwise. One of the multi-icons 38 having still images arranged lengthwise is enlarged and illustrated. M still images 39 having respective frame numbers are arranged as shown in FIG. 10 to form one still image file. By representing the still image file as a multi-icon, the multi-icon 38 having still images arranged lengthwise is obtained.

Figure 11:
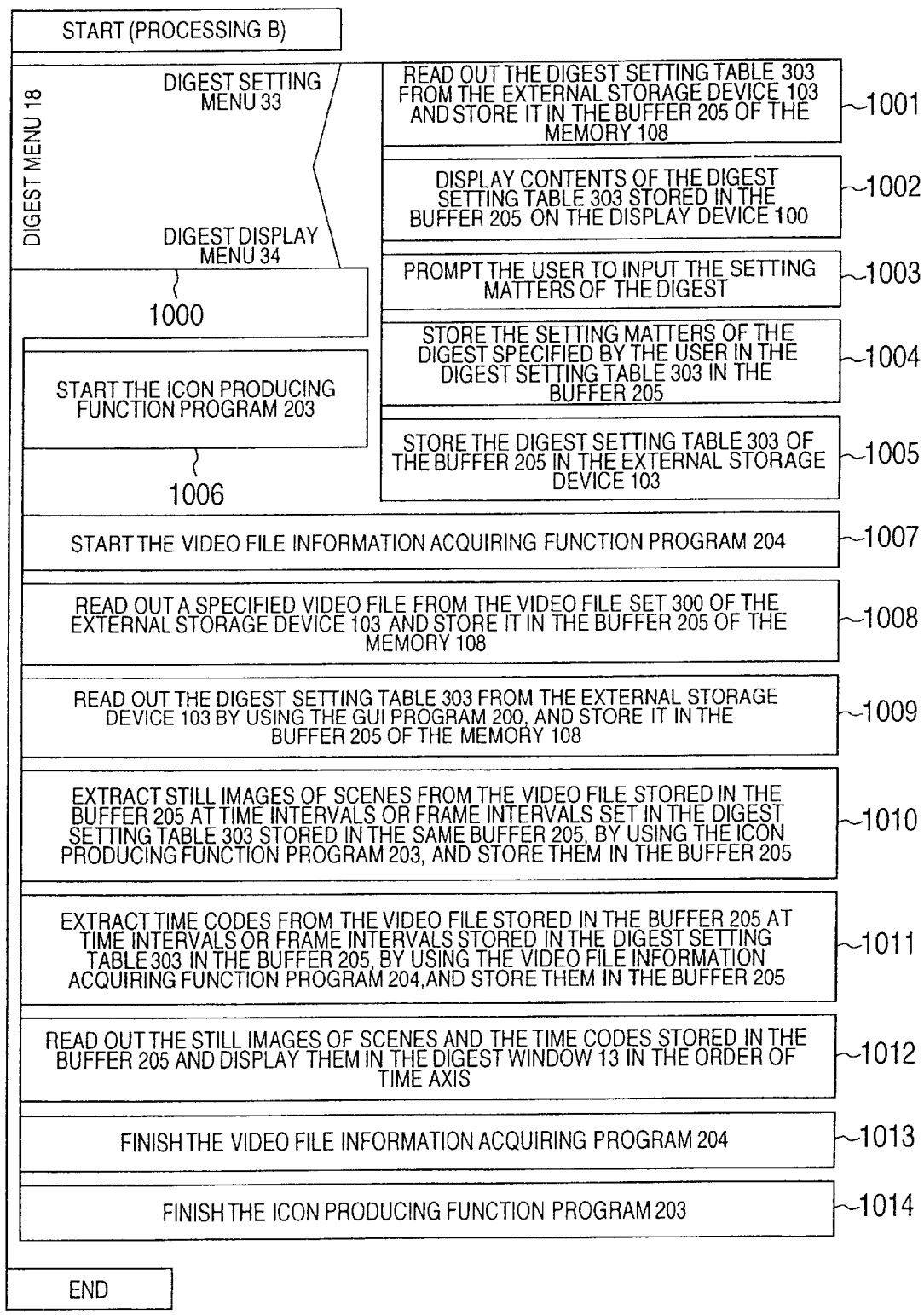
FIG. 11 is a diagram showing processing B conducted when a digest display request is issued.

FIG. 11 is a diagram showing the processing B conducted at the step 712 of FIG. 5 when there is a digest display request issued by the user. In FIG. 11, manipulation for conducting digest display setting and manipulation for displaying a digest of a video file in a digest window 13 (FIG. 17 to FIG. 19) are shown. The processing B is started by selecting either a digest setting menu 33 or the digest display menu 34 (FIG. 12). At step 1000, either the digest setting menu 33 or the digest display menu 34 is selected. If the digest setting menu 33 is selected, then the digest setting table 303 is read out from the external storage device 103 and stored in the buffer 205 at step 1001. At step 1002, contents of the digest setting table 303 are displayed on the display device 100. At step 1003, the user changes the setting as the user desires. At step 1004, the change is stored in the digest setting table 303 of the buffer 205. At step 1005, the digest setting table 303 is stored in the external storage device 103. When conducting a digest display the next time, the digest display is conducted according to the setting. If the user selects the digest display menu 34, a digest display of a specified video file is conducted in the digest window 13. Hereafter, its flow will be described. First of all, at step 1006, the icon producing function program 203 is started. At step 1007, the video file information acquiring function program 204 is started. At step 1008, a specified video file is read from the video file set 300 of the external storage device 103 into the buffer 205 and stored in the buffer 205. At step 1009, the digest setting table 303 is read out from the external storage device 103 by using the GUI program 200 and stored. At step 1010, still images of scenes are extracted from the video file stored in the buffer 205 at intervals set in the digest setting table 303 stored in the buffer 205, by using the icon producing function program 203, and stored in the buffer 205. At step 1011, time codes are extracted from the video file stored in the buffer 205 at intervals set in the digest setting table 303 stored in the buffer 205, by using the video file information acquiring function program 204, and stored in the buffer 205. At step 1012, the still images of scenes and the time codes stored in the buffer 205 are read out and displayed in the digest window 13 in the order of a time axis. At step 1013, therefore, the video file information acquiring function program 204 is finished. At step 1014, the icon producing function program 203 is finished. As a result, the digest display of the video file is completed.

FIG. 12 shows an example of a concrete display screen of an initial state obtained when the processing of FIG. 5 has been finished up to the step 707. In FIG. 12, there are included the display device 100, the interactive video file searching window 10, the browsing window 11, the control panel 12, the menu 15, the icon display menu 16, the icon size menu 17, the digest menu 18, the exit menu 19, a rewind button 20, a frame rewind button 21, a play button 22, a stop button 23, a frame forward button 24, a fast forward button 25, an eject button 26, and a cursor 14. By the way, the cursor 14 moves on the screen of the display device 100 according to the manipulation of the mouse 106 of FIG. 1, and conducts the pointing operation. In the initial setting, a single icon representing a still image of a top scene of each video file is displayed in the browsing window 11 as shown in FIG. 12 as described before with reference to FIG. 5.

Figure 13:
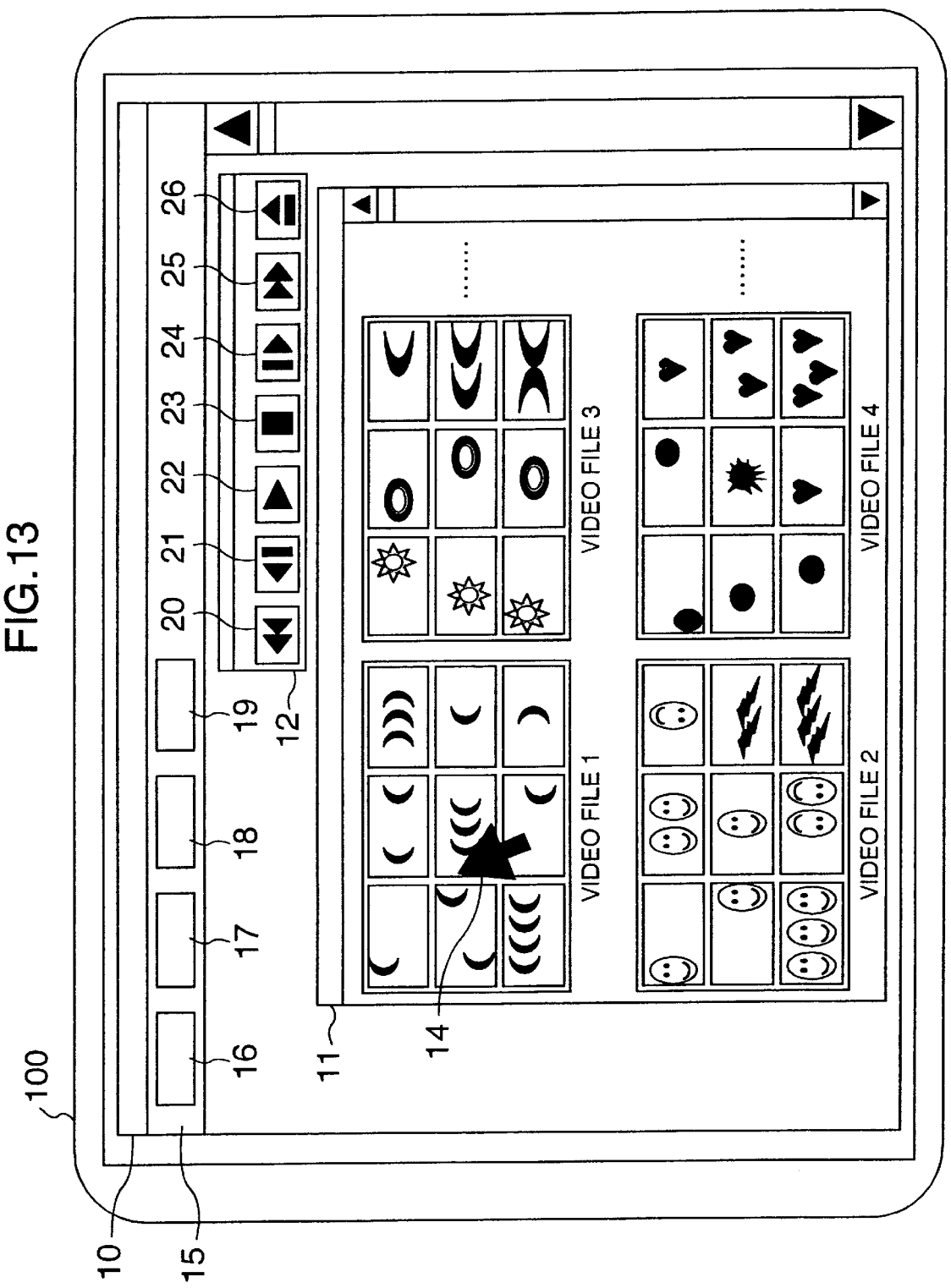
FIG. 13 is a diagram showing a screen on the display device 100 obtained when video files are displayed in a multi-icon form.

FIG. 13 shows an example of a concrete display in the case where still images are arranged in a matrix form in the browsing window 11 in the multi-icon display of FIG. 6. FIG. 13 has the same configuration as that of FIG. 12 except the browsing window 11. By means of this display method using the window 11, it is possible to definitely recognize the contents of each of the video files at a glance. This example shows the case where each multi-icon is displayed with the number H of sheets in the longitudinal direction in the step 900 of FIG. 7 being set to 3, and the number W of sheets in the lateral direction being set to 3.

Figure 14:
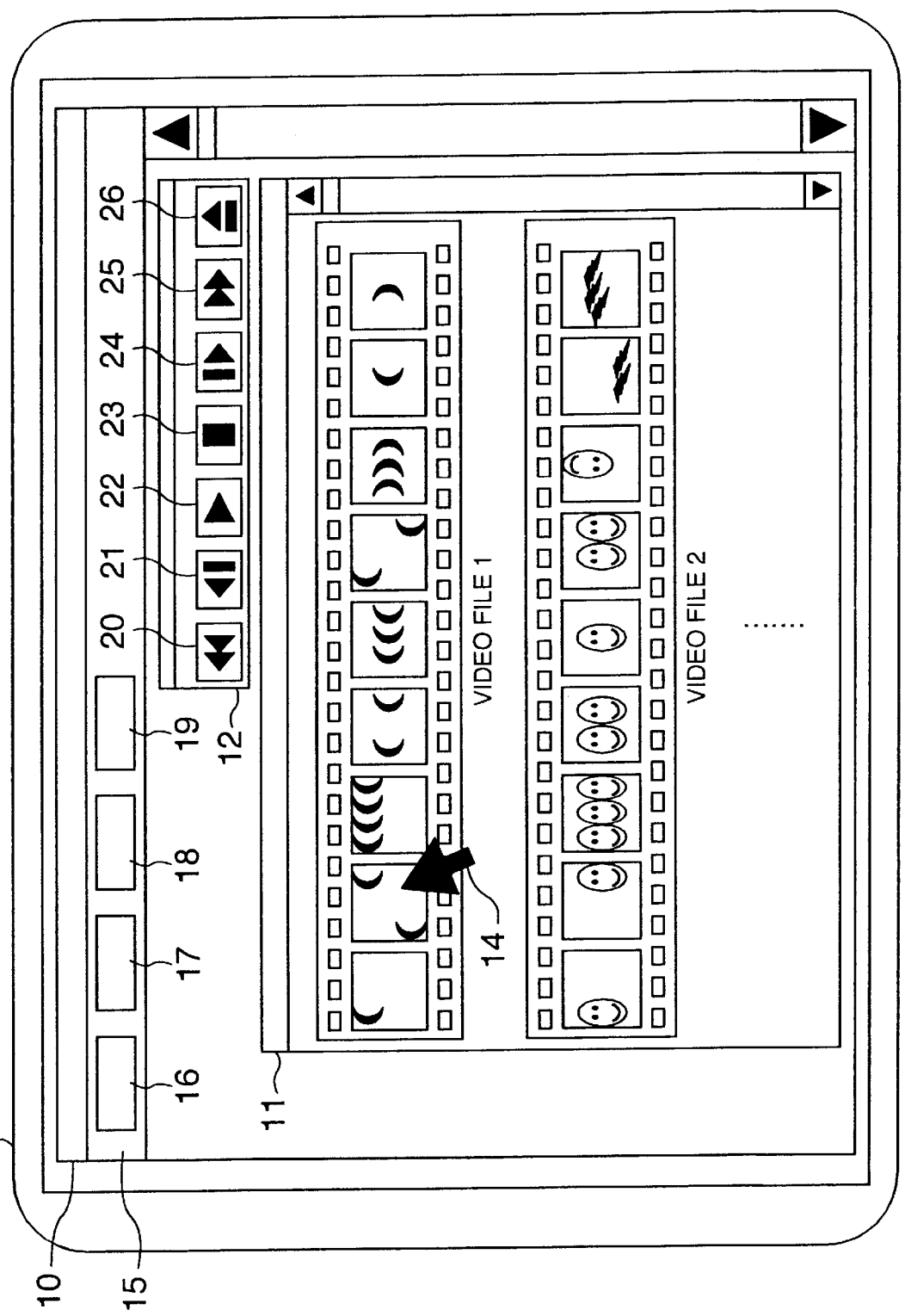
FIG. 14 is a diagram showing a screen on the display device 100 obtained when video files are displayed in a multi-icon form different from that of FIG. 13.

FIG. 14 shows an example of a concrete display in the case where still images are arranged sideways in the browsing window 11 in the multi-icon display of FIG. 6. FIG. 14 has the same configuration as that of FIG. 12 except the browsing window 11. By means of this display method using the window 11, it is possible to definitely recognize the contents of each of the video files at a glance. In the same way as FIG. 13, this example also shows the case where each multi-icon is displayed with the number H of sheets in the longitudinal direction in the step 900 of FIG. 7 being set to 3, and the number W of sheets in the lateral direction being set to 3. Since the user has selected still images arranged sideways, each multi-icon has 9 still images arranged from the left in the order of time axis.

Figure 15:
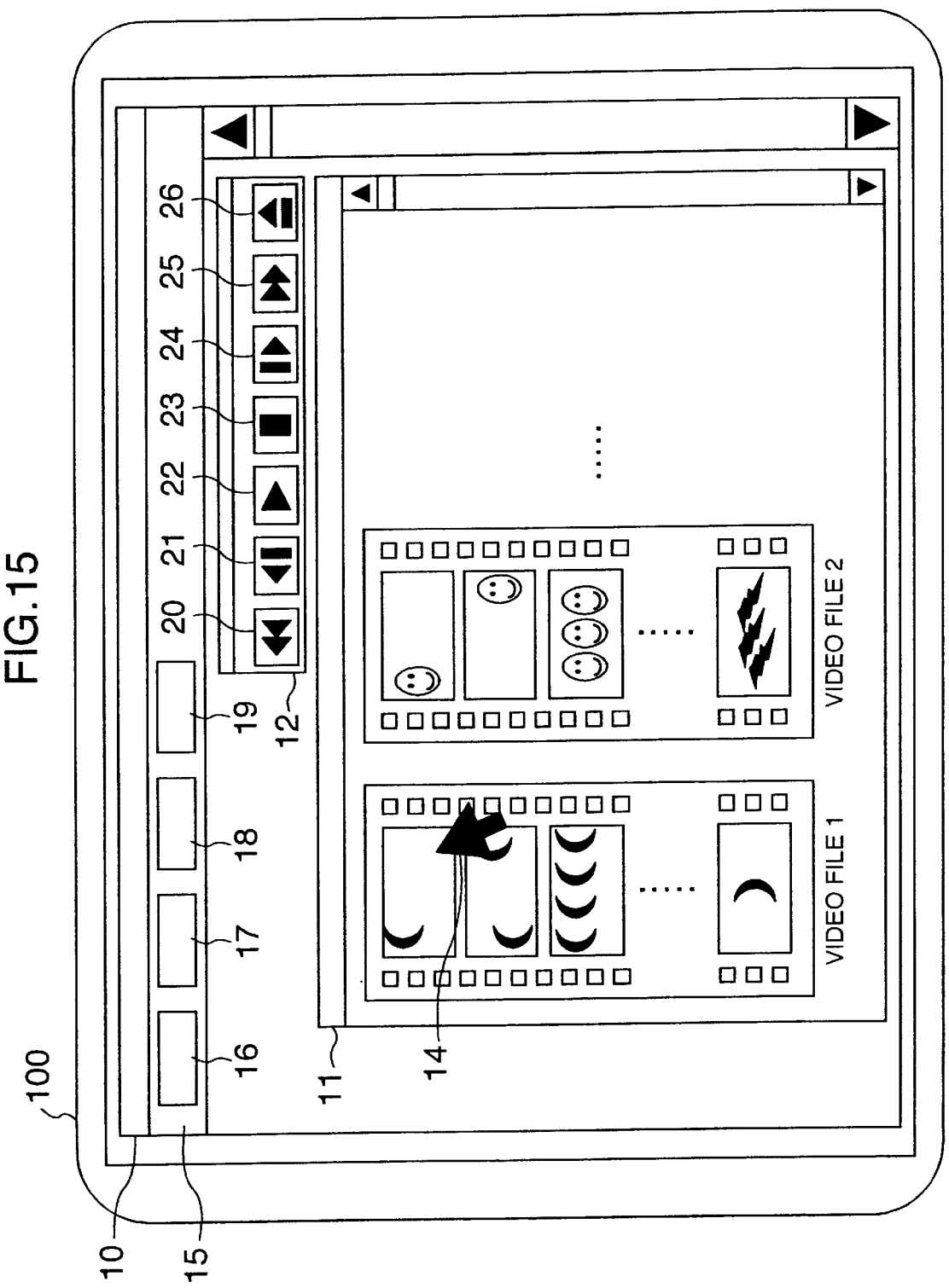
FIG. 15 is a diagram showing a screen on the display device 100 obtained when video files are displayed in a multi-icon form different from that of FIG. 13 and that of FIG. 14.

FIG. 15 shows an example of a concrete display in the case where still images are arranged lengthwise in the browsing window 11 in the multi-icon display of FIG. 6. FIG. 15 has the same configuration as that of FIG. 12 except the browsing window 11. By means of this display method using the window 11, it is possible to definitely recognize the contents of each of the video files at a glance. In the same way as FIG. 13, this example also shows the case where each multi-icon is displayed with the number H of sheets in the longitudinal direction in the step 900 of FIG. 7 being set to 3, and the number W of sheets in the lateral direction being set to 3. Since the user has selected still images arranged lengthwise, each multi-icon has 9 still images arranged from the top in the order of time axis.

Figure 16:
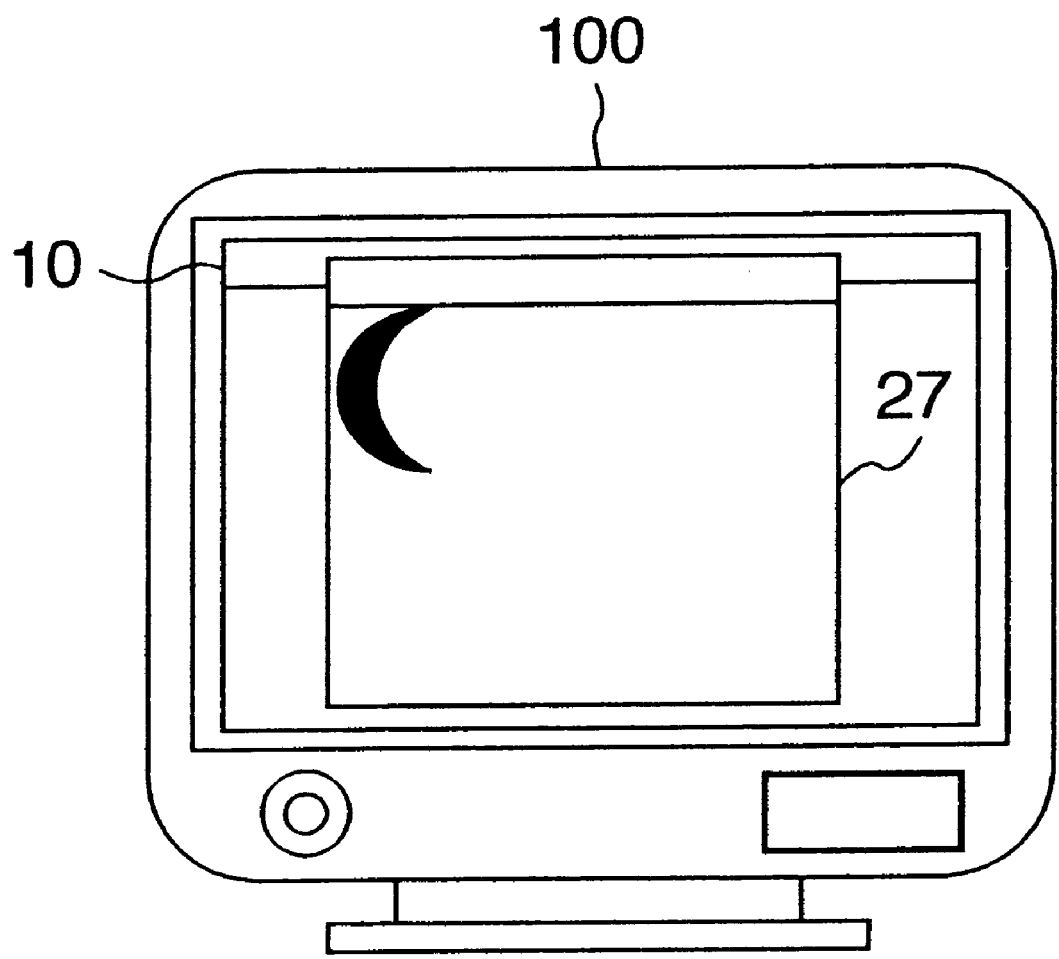
FIG. 16 is a diagram showing a behavior conducted when an icon of a video file displayed in a multi-icon form is double-clicked.

FIG. 16 shows a result of reproduction of a video file conducted by using the decoding means 110 in response to double-clicking a multi-icon. In FIG. 16, the display device 100, the interactive video file searching window 10, and a display window 27 are included. FIG. 16 shows a result of reproduction conducted by double-clicking a multi-icon representing the video file 1 of FIG. 13, FIG. 14 or FIG. 15. The video image is displayed in the display window 27. For this reproduced video image, control such as rewind and frame rewind can be conducted by clicking a control button on the control panel 12.

Figure 17:
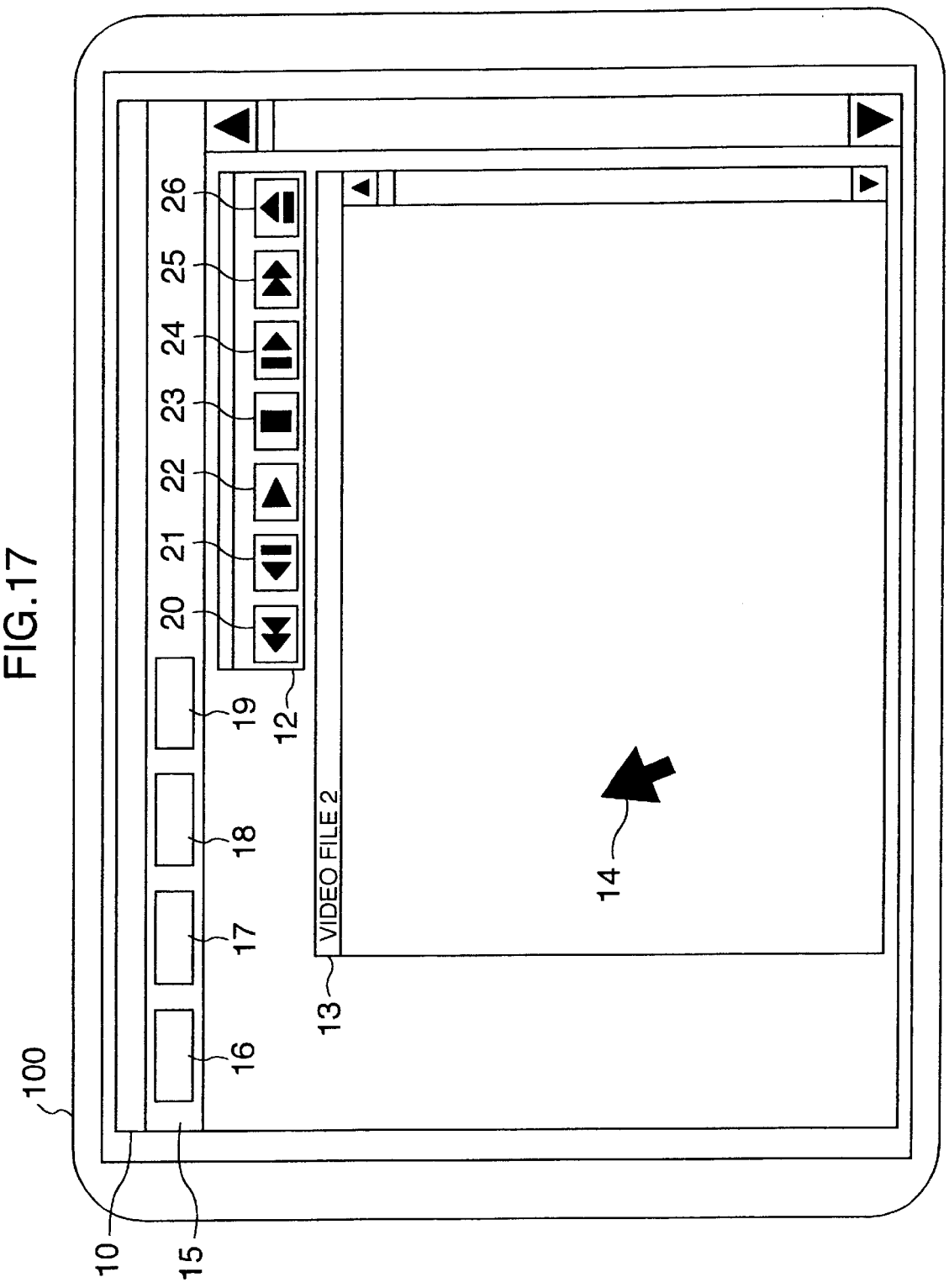

FIG. 17 shows the concrete entire display screen in the case where a digest display of a specified video file has been conducted. In FIG. 17, there are included the display device 100, the interactive video file searching window 10, the digest window 13, the control panel 12, the menu 15, the icon display menu 16, the icon size menu 17, the digest menu 18, the exit menu 19, the rewind button 201, the frame rewind button 21, the play button 22, the stop button 23, the frame forward button 24, the fast forward button 25, the eject button 26, and the cursor 14. FIG. 17 shows the concrete entire display screen of the display device 100 in the case where a digest display of a video file 2 has been conducted. The digest display of the video file 2 will be described with reference to FIG. 18.

Figure 18:
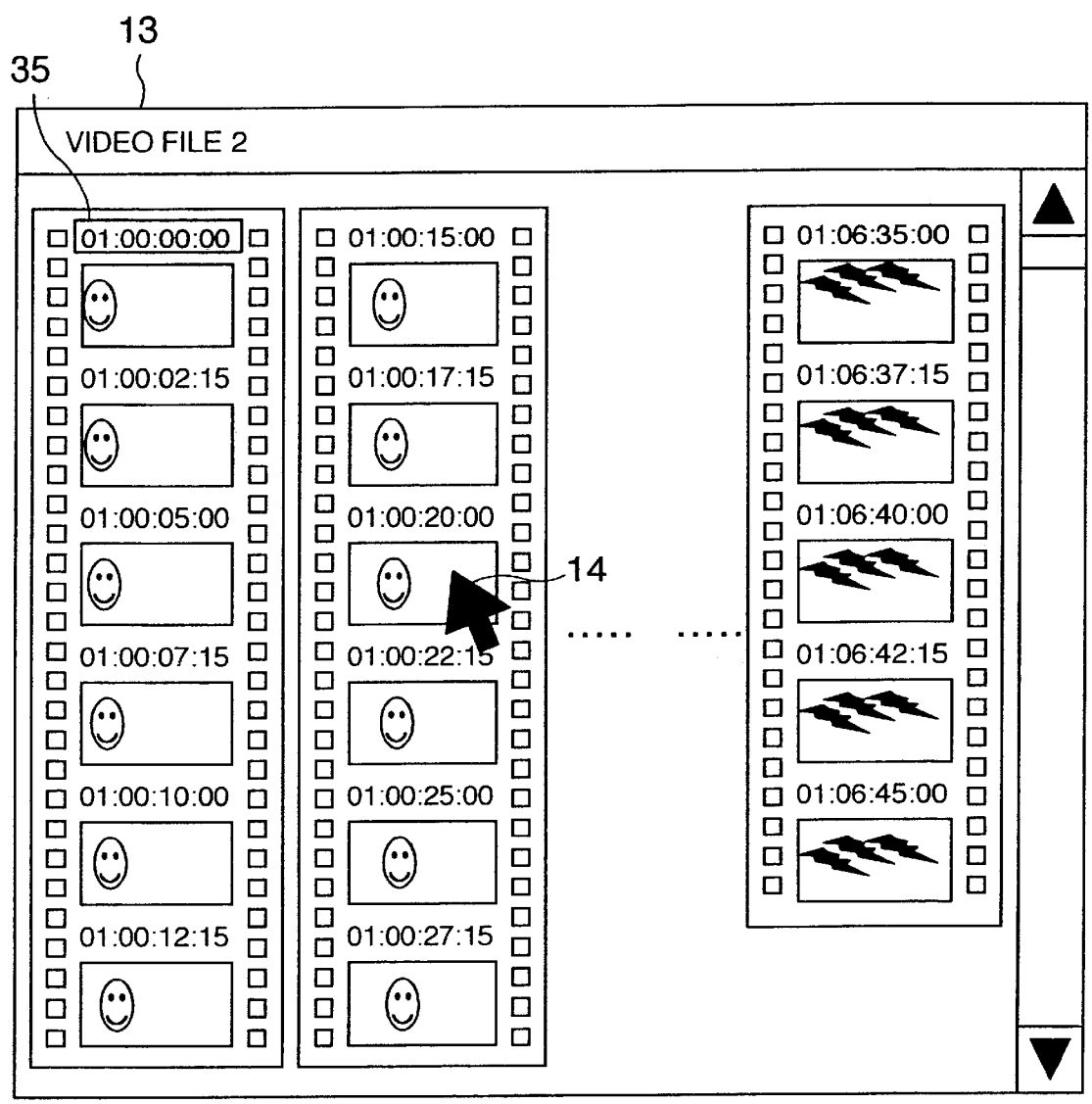
FIG. 18 is a diagram showing a state obtained by extracting only a digest window 13 displaying frames of a video file at equal frame intervals from FIG. 17 and enlarging the digest window 13.

FIG. 18 is an enlarged view of the digest window 13 of FIG. 17. In FIG. 18, the digest window 13, the cursor 14, and time codes 35 are included. FIG. 18 shows an example of a digest display of a certain video file conducted at equal frame intervals. In this example, scene still images are extracted from the video file 2 at 75 frame intervals, and they are displayed in the digest window 13 as a digest display. Above each of images displayed by using a still image file produced from still images of scenes extracted from the specified video file, a time code 35 of the still image of that scene is displayed. As a result, details of the video file can be confirmed without conducting reproduction.

Figure 19:
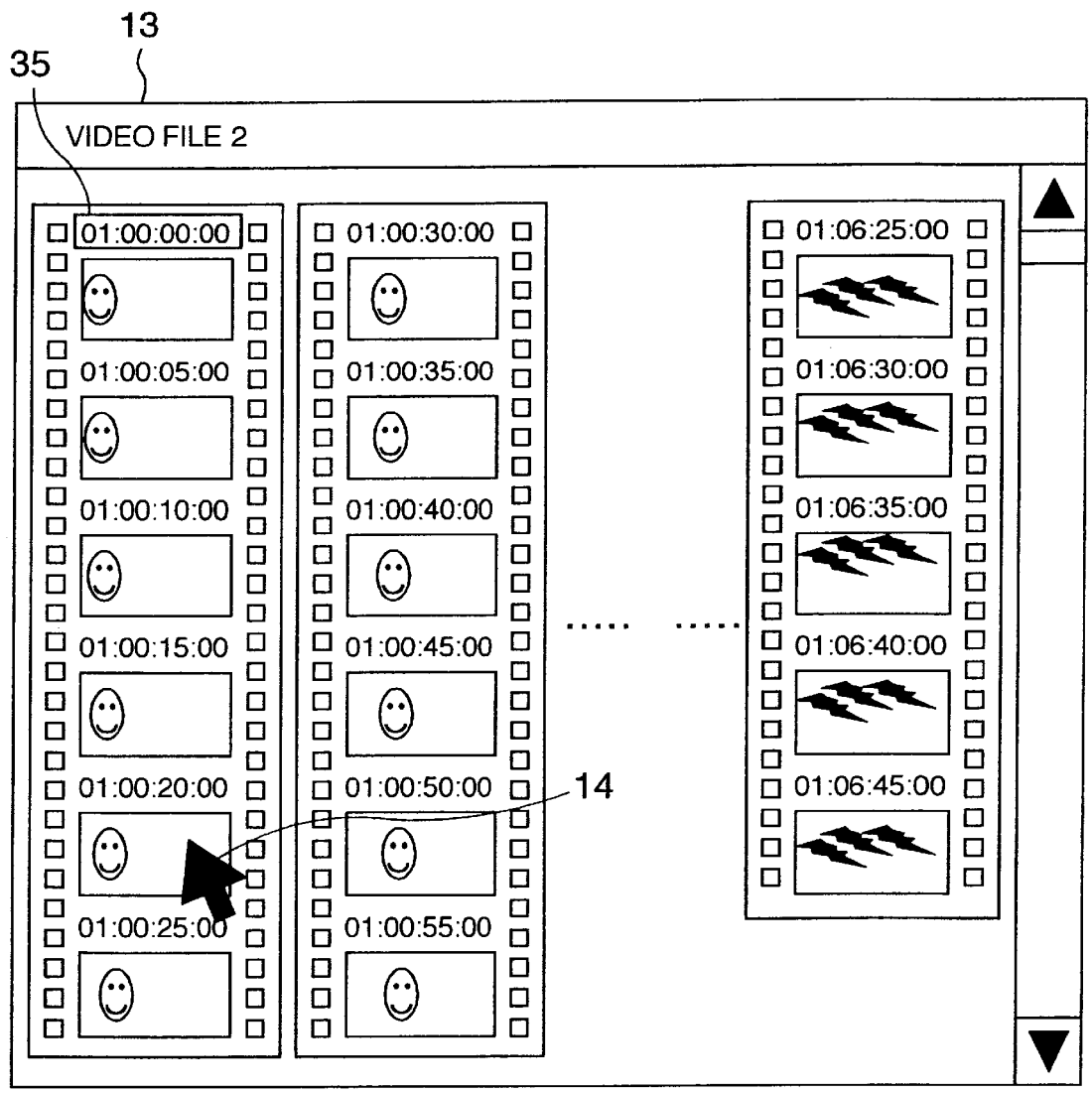
FIG. 19 is a diagram showing a state obtained by extracting only a digest window 13 displaying frames of a video file at equal time intervals from FIG. 17 and enlarging the digest window 13.

FIG. 19 is an enlarged view of the digest window 13 of FIG. 17. In FIG. 19, the digest window 13, the cursor 14, and the time codes 35 are included. FIG. 19 shows an example of a digest display of a certain video file conducted at equal time intervals. In this example, scene still images are extracted from the video file 2 every 5 seconds, and they are displayed in the digest window 13 as a digest display. Above each of images displayed by using a still image file produced from still images of scenes extracted from the specified video file, a time code 35 of the still image of that scene is displayed. As a result, details of the video file can be confirmed without conducting reproduction.

It is now assumed that the user chooses a still image of a scene displayed in the digest window 13, and double-clicks the still image of that scene with the mouse 106 of FIG. 1.

Figure 20:
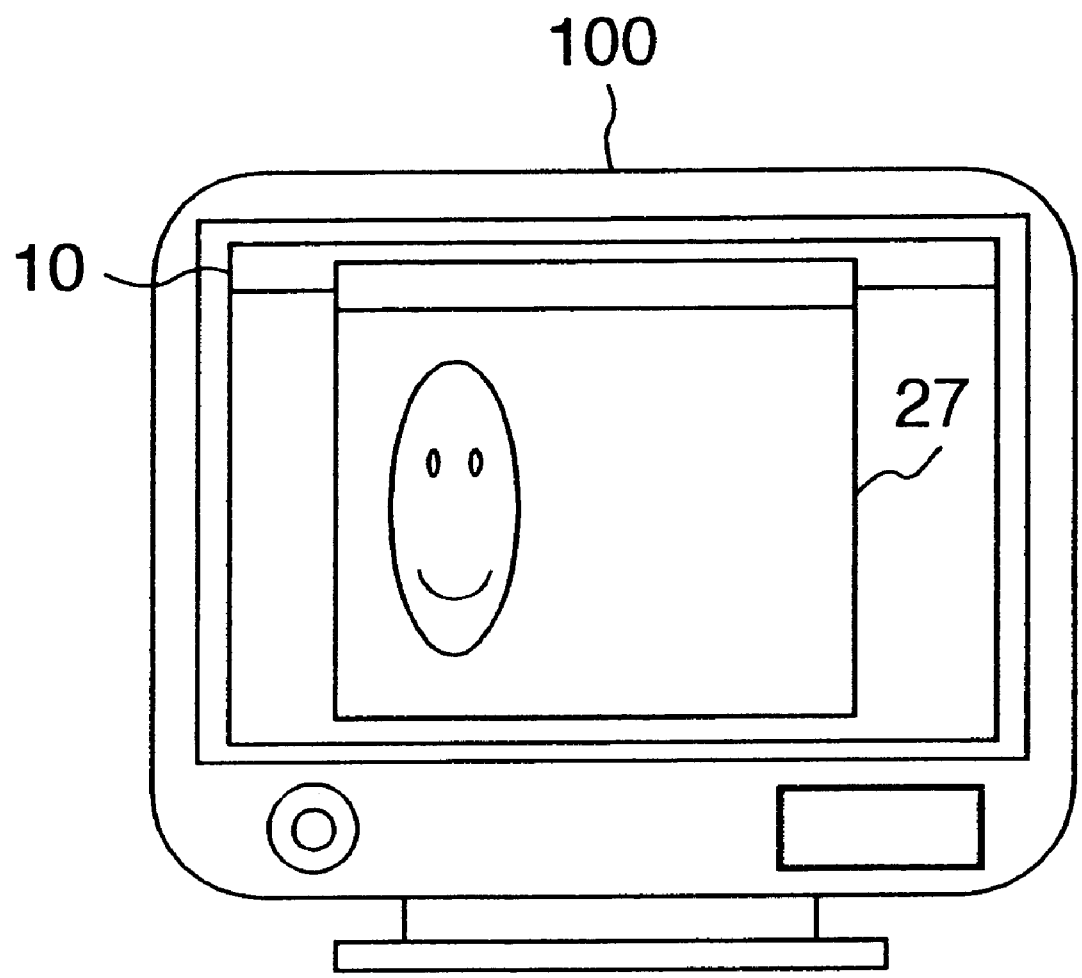
FIG. 20 is a diagram showing a behavior conducted when a digest display of a video file shown in FIG. 18 or 19 is performed and an image of a certain frame number is double-clicked.

From the still image of that scene serving as the head, therefore, the video file is reproduced by using the decoding means 110. FIG. 20 shows this state. In FIG. 20, the display device 100, the interactive video file searching window 10, and the display window 27 are included. In FIG. 20, the video file 2 is reproduced for searching from a scene having a time code of 01:00:20:00 (frame number 600) in the digest display of the video file 2 in FIG. 18 or 19. The video image is displayed in the display window 27.

Figure 21:
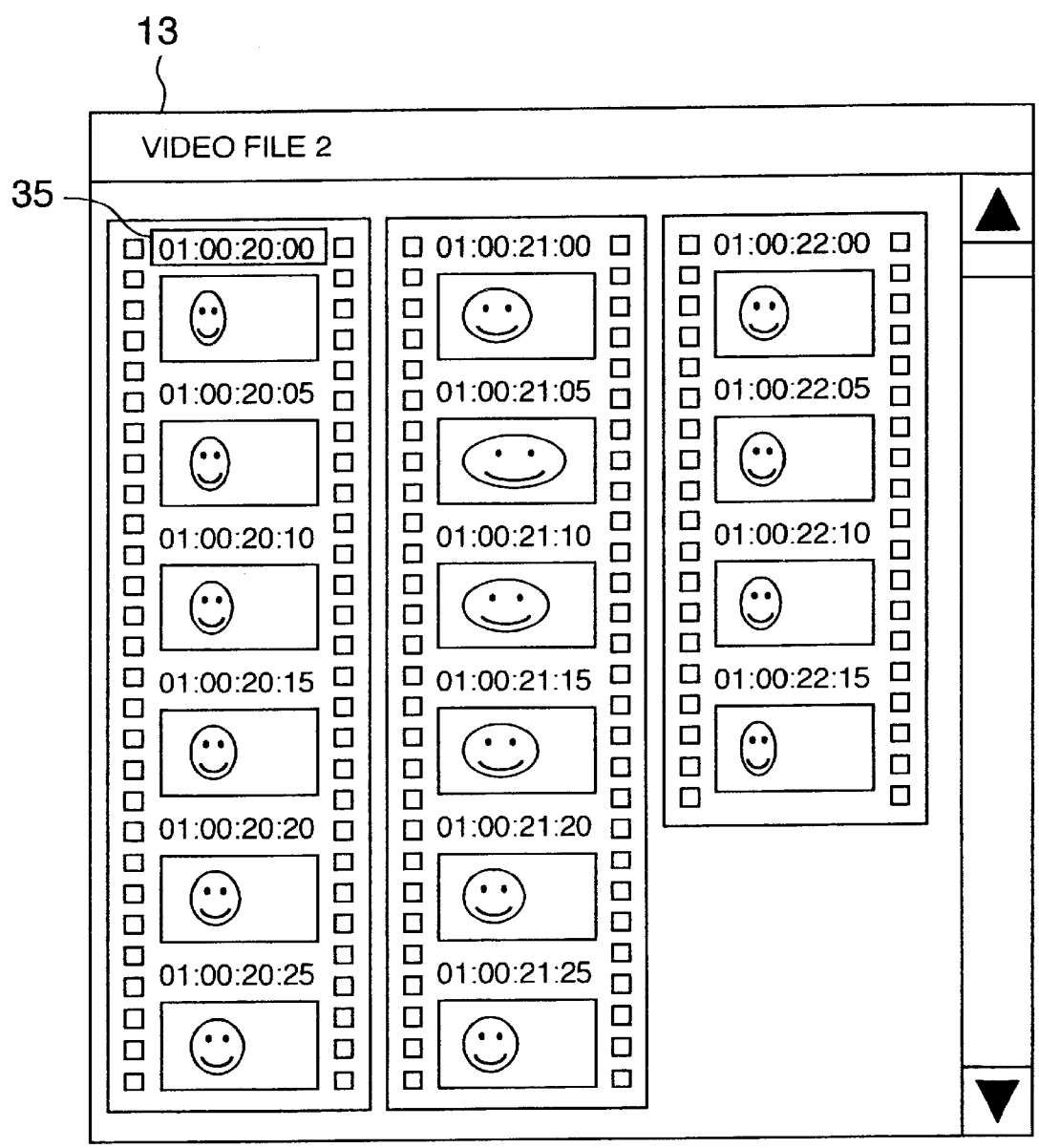
FIG. 21 is a diagram showing a behavior conducted when a digest display is further performed for a section ranging from a selected frame image to the next frame image in the digest of the video file of FIG. 18.

It is now assumed that the user selects a still image corresponding to a desired scene in the digest display of the video file and thereafter selects the digest display menu 34 (FIG. 12). As a result, a digest display of a section ranging from the selected still image to the next still image is further conducted in the digest window 13. FIG. 21 shows the state at that time. In FIG. 21, the digest window 13 and the time codes 35 are included. In the case of FIG. 21, the user selects a still image corresponding to the scene having the time code of 01:00:20:00 (frame number 600) in the digest display of the video file 2 in FIG. 18, then conducts setting so as to produce a digest display at 5 frame intervals by using the digest setting menu 33, and selects the digest display menu 34 to conduct the digest display. FIG. 21 shows the digest window 13 in this case. As will be understood, scene still images of the video images are extracted every 5 frames in the range from the selected scene having the time code of 01:00:20:00 (frame number 600) to the next scene having the time code of 01:00:22:15 (frame number 675). At this time as well, by choosing a still image and double-clicking the still image with the mouse 106 of FIG. 1, the video file can be reproduced by using the decoding means 110 from the scene of that still image serving as the head.

By conducting the multi-icon display of the video files stored in the external storage device 103 as heretofore described, it becomes possible to definitely confirm the contents of each of the video files at a glance without conducting the reproduction work. In addition, by conducting the digest display, details of the video file can be confirmed without conducting the reproduction work. These representation methods of the video files are representation methods whereby in searching for a stored video file the search can be accomplished very efficiently.

Figure 22:
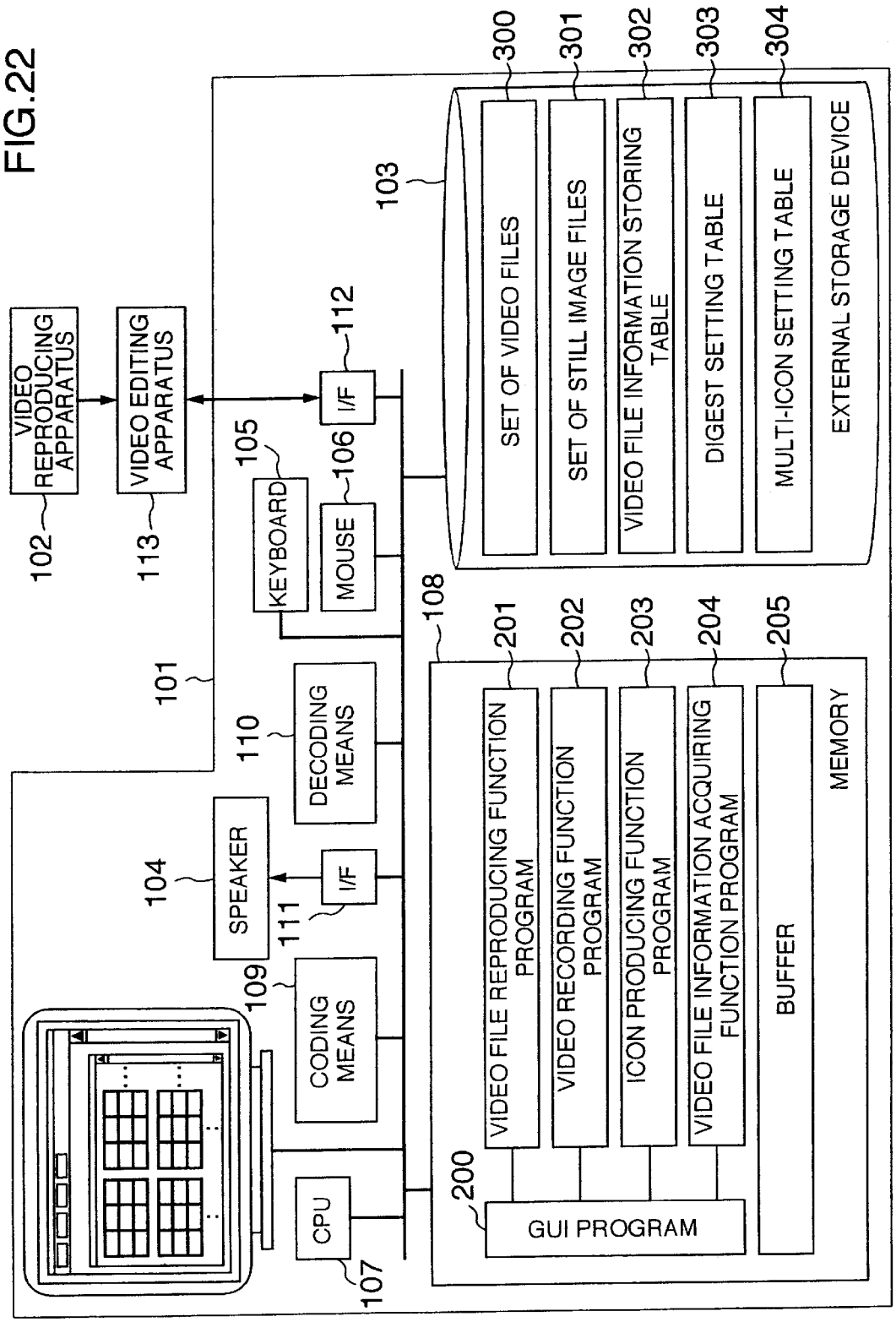
FIG. 22 is a schematic block diagram showing one embodiment to which the present invention has been applied.

FIG. 22 shows an embodiment in which the present invention has been applied to a disk recorder. The disk recorder means a video deck using a hard disk as storage medium. In this case, it is possible to edit video materials supplied from the video reproducing apparatus 102 by control from a video editing apparatus 113 and store a result of the editing in the external storage device 103 of the video searching apparatus 101 in the form of moving images or video images. Furthermore, by conducting the multi-icon display in the browsing window 11 or the digest display in the digest window 13, it is possible to search contents of the video files stored in the external storage device 103 of the video searching apparatus 101 and confirm the details efficiently.

As for various programs stored in the memory 108 and the external storage device 103, they can be installed from programs stored in a recording medium such as a CD-ROM, DVD-ROM or a semiconductor memory. Alternately, they may be loaded from an external device such as a server into the memory 108 or the external storage device 103 of the present apparatus. In the programs, a group image reproducing program and a group image searching program are also included.

Figure 23:
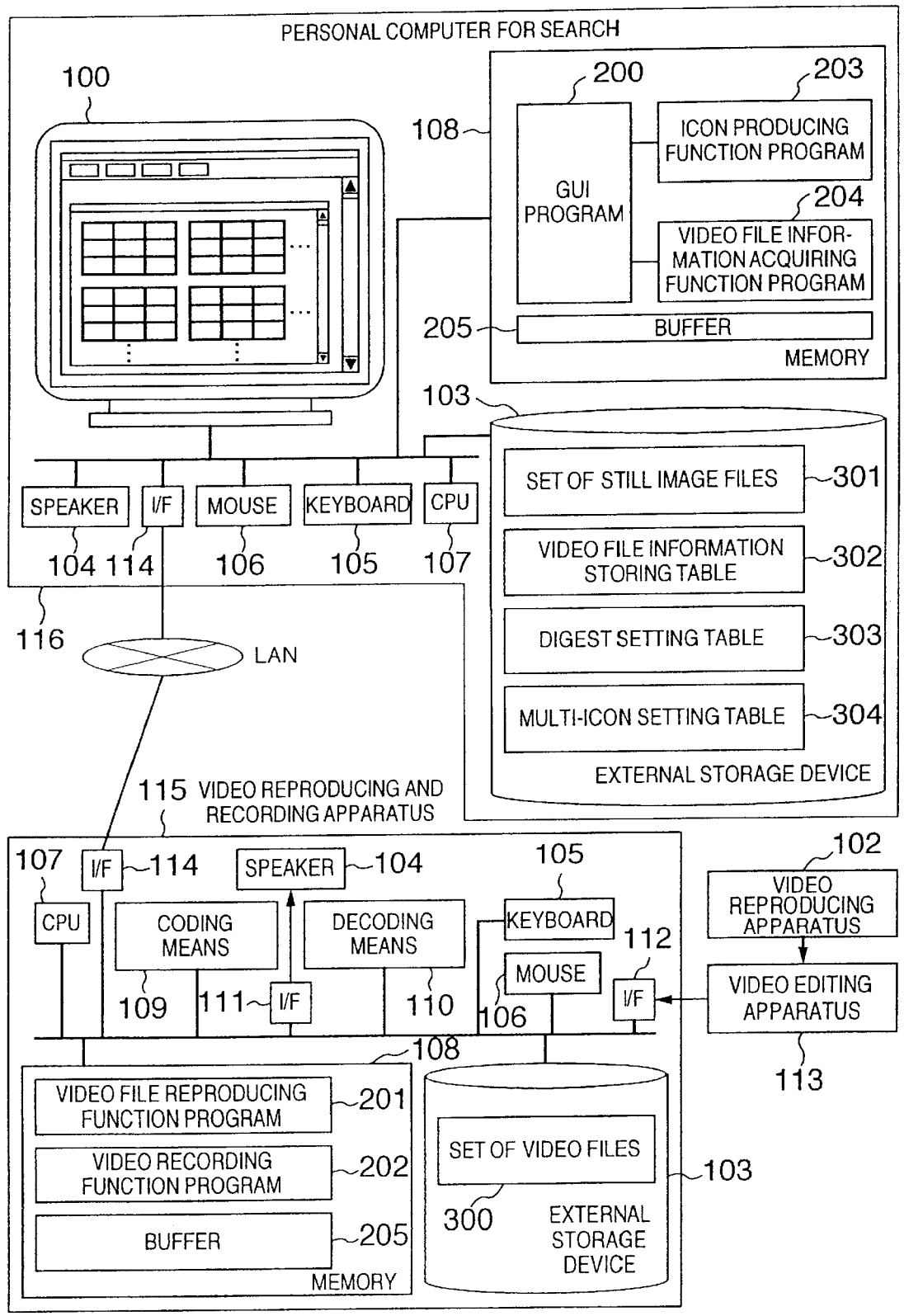
FIG. 23 is a schematic block diagram showing a different embodiment, different from the embodiment of FIG. 22, to which the present invention has been applied.

FIG. 23 shows an example in which the present invention is utilized as a disk recorder via a LAN. In this case, the programs stored in a memory 108 of a personal computer 116 for search are only the icon producing function program 203, the video file information acquiring function program 204, and the GUI program 200 for controlling these two programs. Programs stored in a memory of a video reproducing and recording apparatus 115 located at a distance from the personal computer 116 for search are only the video file reproducing function program 201 and the video recording function program 202. In other words, the programs concerning the present invention are not stored in one apparatus, but are stored and used separately. In the video reproducing and recording apparatus 115, it is possible to store moving images or video images in the external storage device 103 and reproduce the video images by control from a video editing apparatus 113. The personal computer 116 for search can conduct a search and confirm details via a LAN in order to know what video files are stored beforehand in the external storage device 103 of the video reproducing and recording apparatus 115 located at a distance from the personal computer 116 for search.

Figure 24:
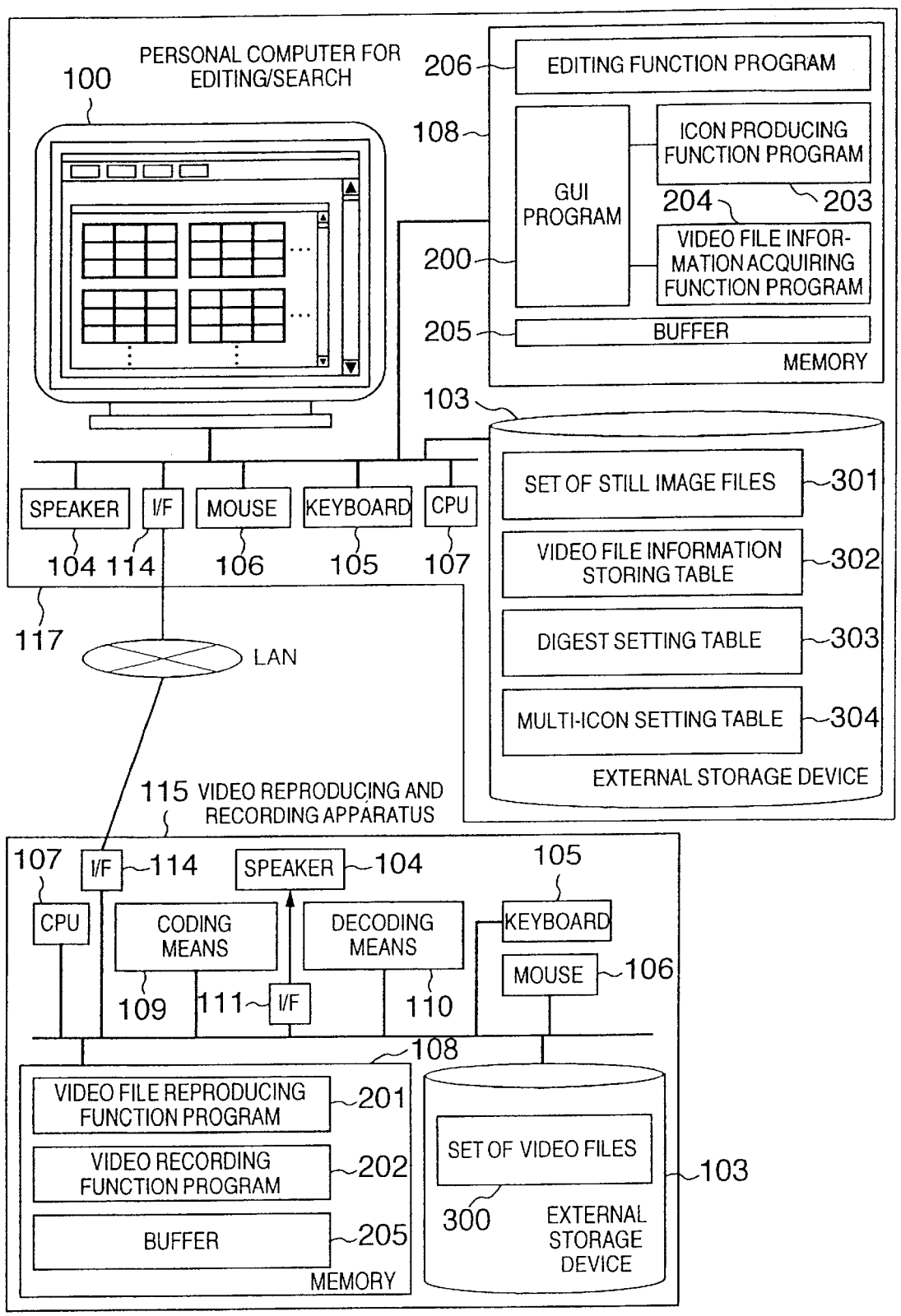
FIG. 24 is a schematic block diagram showing a further different embodiment, different from the embodiment of FIG. 23, to which the present invention has been applied.

FIG. 24 shows an example in which an editing function program 206 is added to the memory 108 of the personal computer 116 for search in the application example of FIG. 23. Programs stored in the memory 108 of a personal computer 117 for editing/search are the icon producing function program 203, the video file information acquiring function program 204, the GUI program 200 for controlling these two programs, and the editing function program 206. Programs stored in the memory 108 of the video reproducing and recording apparatus 115 located at a distance from the personal computer 117 for editing/search are only the video file reproducing function program 201 and the video recording function program 202. In this case, the contents of stored moving images or video images can be definitely recognized by using the multi-icon display or digest display of the video files. At the time of video editing work, therefore, desired moving images or video images can be searched for certainly without leaving the editing work. In addition, the moving images or video images thus searched for can be edited efficiently, and the result of editing can be stored in the storage device efficiently.

The present invention is not limited to the embodiments heretofore described, but various changes are possible without departing from the spirit of the present invention.

In the present specification, the term "means" does not necessarily mean physical means, but includes the case where the function of each means is implemented by software and the case where the function of each means is implemented by hardware. Furthermore, the function of one means may be implemented by two or more physical means, or the function of two or means may be implemented by one means.

According to the present invention, the contents of a video file stored in a storage device can be definitely recognized by representing the video file by means of a multi-icon without reproducing the video file. Furthermore, the size of the single icon or the multi-icon can be changed at any time. By manipulation of the single icon or the multi-icon, file manipulation such as deletion, movement and name alteration of a video file corresponding thereto can be conducted. In searching enormous video files, the work efficiency of the user can be increased. Furthermore, by producing a digest displaying scene still images at predetermined frame intervals or time intervals for each of the video files, more detailed contents can be confirmed. In addition, since reproduction can be conducted from a selected position, it is also possible for the user to watch and listen to a desired video file. Furthermore, by adding the function of controlling the storage device and the function of editing the stored moving images or video images, desired moving images or video images can be searched certainly in the video editing work without leaving the editing work, because the contents of the stored moving images or video images can be recognized definitely. In addition, the moving images or video images thus searched for can be edited efficiently, and its editing result can be stored in the storage device efficiently.

What is claimed is:

1. A video searching method for storing a plurality of video images in a storage device as respective video files, and searching and displaying the video files, the video searching method comprising the steps of:

extracting, from each of the plurality of video files stored in the storage device, a plurality of images for representing contents of the video file at predetermined intervals beforehand;

producing one group image file for each of the video files from the plurality of images extracted from the video file, the one group image file storing a group image corresponding to the video file, the group image being an image obtained by arranging the extracted plurality of images in a predetermined arrangement and lumping the extracted plurality of images together in the predetermined arrangement; and displaying at least one of the group images respectively corresponding to the video files stored in the storage device on a display device using at least one of the group image files storing the at least one of the group images.

2. A video searching method according to claim 1, further comprising the steps of:

prompting a user to select a desired video file from the plurality of video files stored in the storage device using a directory, the directory having a hierarchy structure provided by a file system to facilitate management by the user of the plurality of video files stored in the storage device;

extracting a plurality of images from the selected1 video file at predetermined intervals beforehand;

displaying the extracted plurality of images on the display device; and displaying one of the video images corresponding to the video file selected by the user beginning from a position of an arbitrary one of the extracted plurality of images selected by the user.

3. A video searching method for storing a plurality of video images in a storage device as respective video files, and searching and displaying the video files, the video searching method comprising the steps of:

prompting a user to select a desired video file from the plurality of video files;

extracting a plurality of images from the selected video file at predetermined intervals beforehand;

displaying the extracted plurality of images corresponding to the predetermined intervals on a display device;

extracting a plurality of images from a portion of the selected video file corresponding to extracted images of an arbitrary one of the predetermined intervals selected by the user at desired intervals;

displaying the extracted plurality of images corresponding to the desired intervals on a display device; and displaying a portion of one of the video images corresponding to the selected video file beginning from a position of an arbitrary one of the extracted plurality of images corresponding to the desired intervals selected by the user.

4. A video searching apparatus for storing a plurality of video images in a storage device as respective video files, and searching and displaying the video files, the video searching apparatus comprising:

group image producing means for extracting, from each of the plurality of video files stored in the storage device, a plurality of images for representing contents of the video file at predetermined intervals beforehand, and producing one group image file for each of the video files from the plurality of images extracted from the video file, the one group image file storing a group image corresponding to the video file, the group image being an image obtained by arranging the extracted plurality of images in a predetermined arrangement and lumping the extracted plurality of images together in the predetermined arrangement; and group image display means for displaying at least one of the group images respectively corresponding to the video files stored in the storage device using at least one of the group image files storing the at least one of the group images, the group image display means being associated with the group image producing means.

5. A video searching apparatus according to claim 4, further comprising:

means for storing video images in a storage device2 as respective video files;

a storage device for storing the video files therein; and means for communicating with the storage device.

6. A video searching apparatus according to claim 5, further comprising means for editing the video files stored in the storage device.

7. A video searching method for storing a plurality of video images in a storage device as respective video files, and producing auxiliary video searching images to search the video files, the video searching method comprising the steps of:

extracting, from each of the plurality of video files stored in the storage device, a plurality of images for representing contents of the video file at predetermined intervals beforehand;

producing one group image file for each of the video files from the plurality of images extracted from the video file, the one group image file storing a group image corresponding to the video file, the group image being an image obtained by arranging the extracted plurality of images in a predetermined arrangement and lumping the extracted plurality of images together in the predetermined arrangement.

8. A computer-readable storage medium storing a video searching program for storing a plurality of video images in a storage device as respective video files, and searching and displaying the video files, the video searching program comprising:

an instruction for extracting, from each of the plurality of video files stored in the storage device, a plurality of images for representing contents of the video file at predetermined intervals beforehand;

an instruction for producing one group image file for each of the video files from the plurality of images extracted from the video file, the one group image file storing a group image corresponding to the video file, the group image being an image obtained by arranging the extracted plurality of images in a predetermined arrangement and lumping the extracted plurality of images together in the predetermined arrangement; and an instruction for displaying at least one of the group images respectively corresponding to the video files stored in the storage device on a display device using at least one of the group image files storing the at least one of the group images.

9. A computer program product including a storage medium, the storage medium storing a video information producing program for storing a plurality of video images in a storage device as respective video files, and producing auxiliary video searching images to search the video files by using a computer, the computer program product comprising:

program means recorded on the storage medium for causing the computer to extract, from each of the plurality of video files stored in the storage device, a plurality of images for representing contents of the video file at predetermined intervals beforehand; and program means recorded on the storage medium for causing the computer to produce one group image file for each of the video files from the plurality of images extracted from the video file, the one group image file storing a group image corresponding to the video file, the group image being an image obtained by arranging the extracted plurality of images in a predetermined arrangement and lumping the extracted plurality of images together in the predetermined arrangement.

\* \* \* \* \*